United States Patent [19]
Nakamura et al.

[11] Patent Number: 5,788,563
[45] Date of Patent: Aug. 4, 1998

[54] METHOD AND APPARATUS FOR MANUFACTURING CHAIN-LIKE FOOD PRODUCTS SUCH AS SAUSAGES OR THE LIKE

[75] Inventors: Minoru Nakamura, Tokyo; Minoru Kasai, Ebina, both of Japan

[73] Assignee: Hitec Co., Ltd., Tokyo, Japan

[21] Appl. No.: 640,279

[22] Filed: Apr. 30, 1996

[30] Foreign Application Priority Data

Jan. 31, 1996  [JP]  Japan .................................. 7-035702

[51] Int. Cl.$^6$ ............................................. A22C 11/10
[52] U.S. Cl. ................................................. 452/47; 452/48
[58] Field of Search .............................. 452/47, 48, 46

[56] References Cited

U.S. PATENT DOCUMENTS

| | | |
|---|---|---|
| 1,366,133 | 1/1921 | Hottmann . |
| 3,694,853 | 10/1972 | Greider . |
| 3,835,503 | 9/1974 | Townsend et al. . |
| 3,868,747 | 3/1975 | Townsend et al. ........................ 452/47 |
| 3,873,744 | 3/1975 | Townsend et al. . |
| 3,952,370 | 4/1976 | Greider . |
| 4,112,546 | 9/1978 | Müller ..................................... 452/47 |
| 4,129,923 | 12/1978 | Hoegger . |
| 4,539,796 | 9/1985 | Nakamura et al. . |
| 4,614,005 | 9/1986 | Townsend . |
| 4,671,042 | 6/1987 | Moekle et al. . |
| 4,766,645 | 8/1988 | Lamartino et al. ....................... 452/37 |
| 5,049,108 | 9/1991 | Staudenrausch . |
| 5,480,346 | 1/1996 | Kasai et al. . |

FOREIGN PATENT DOCUMENTS

| | | |
|---|---|---|
| 2 342 663 | 3/1977 | France . |
| 46-33916 | 11/1971 | Japan . |
| 49-101577 | 9/1974 | Japan . |
| 50-91489 | 7/1975 | Japan . |
| 1-13329 | 3/1989 | Japan . |
| 1 534 239 | 11/1978 | United Kingdom . |

*Primary Examiner*—Willis Little
*Attorney, Agent, or Firm*—Nixon & Vanderhye

[57] ABSTRACT

An apparatus for manufacturing chain-like food products such as sausages or the like includes a stuffing nozzle over which a natural intestine is fitted and a pinching device for pinching and conveying a stuffed natural intestine in the forward direction of the stuffing nozzle. A stuffing material is discharged from a distal end of the stuffing nozzle into a straightened natural intestine portion of the natural intestine to form a stuffed natural intestine portion. The stuffed natural intestine portion is nipped, and is pulled as it is moved forwardly of the distal end of the stuffing nozzle to reduce the diameter of the straightened natural intestine portion so as to cause the straightened natural intestine portion to come into contact with an outer periphery of the stuffing nozzle. The stuffing nozzle with which the straightened natural intestine portion is brought into contact is rotated to rotate the stuffed natural intestine portion. The stuffed natural intestine portion being rotated and moved is pinched to form a twist. The discharge of the stuffing material into the straightened natural intestine portion is effected while the stuffed natural intestine portion and the straightened natural intestine portion are being moved.

30 Claims, 15 Drawing Sheets

III-III SECTIONAL VIEW OF Fig.1

II-II SECTIONAL VIEW OF Fig.1

I-I SECTIONAL VIEW OF Fig.1

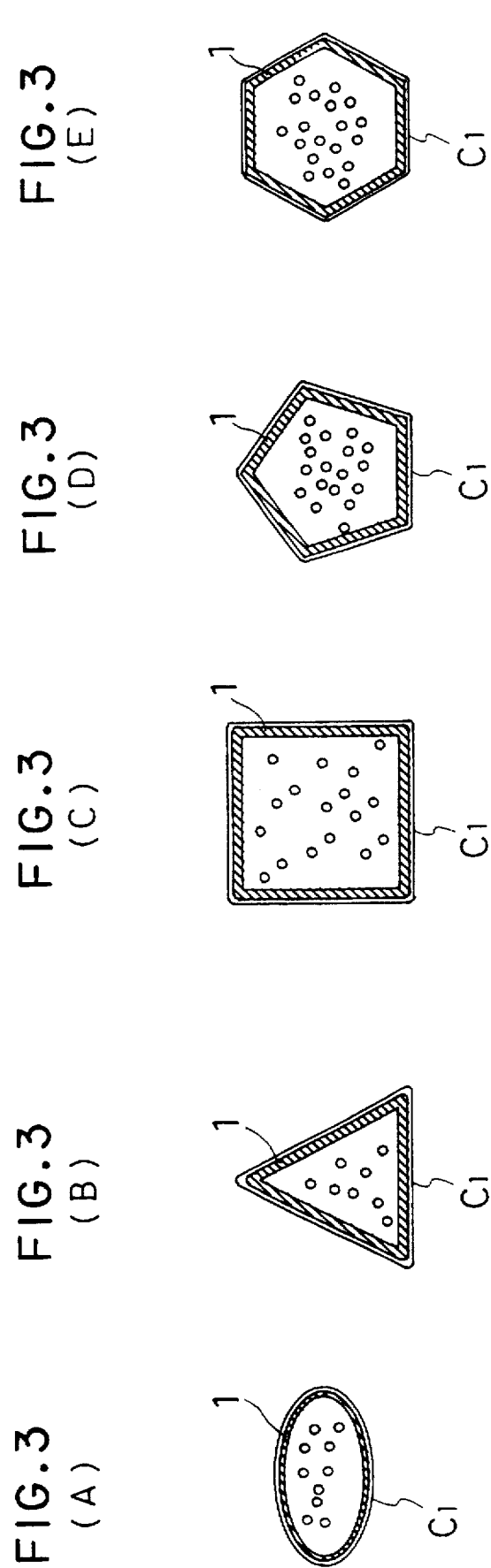

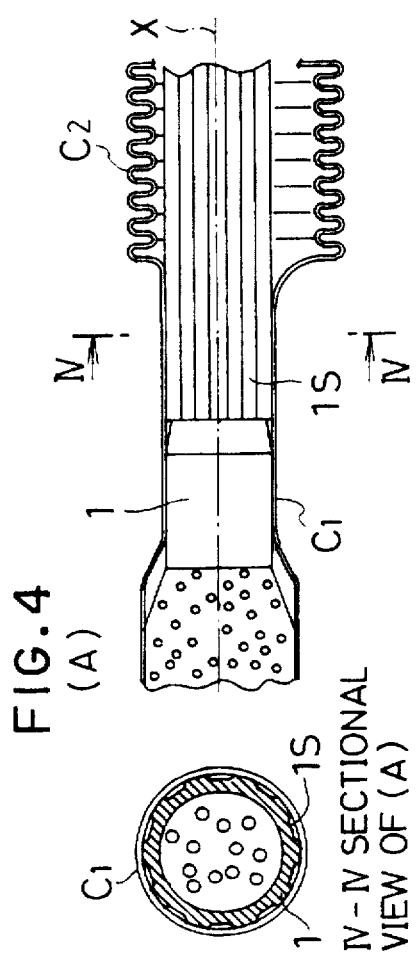
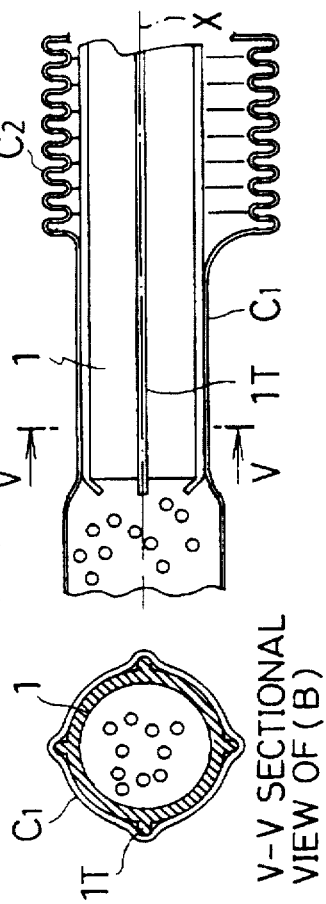
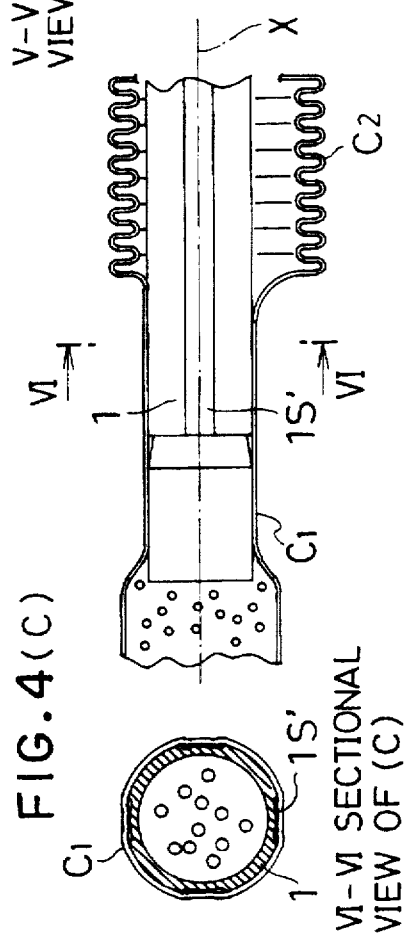

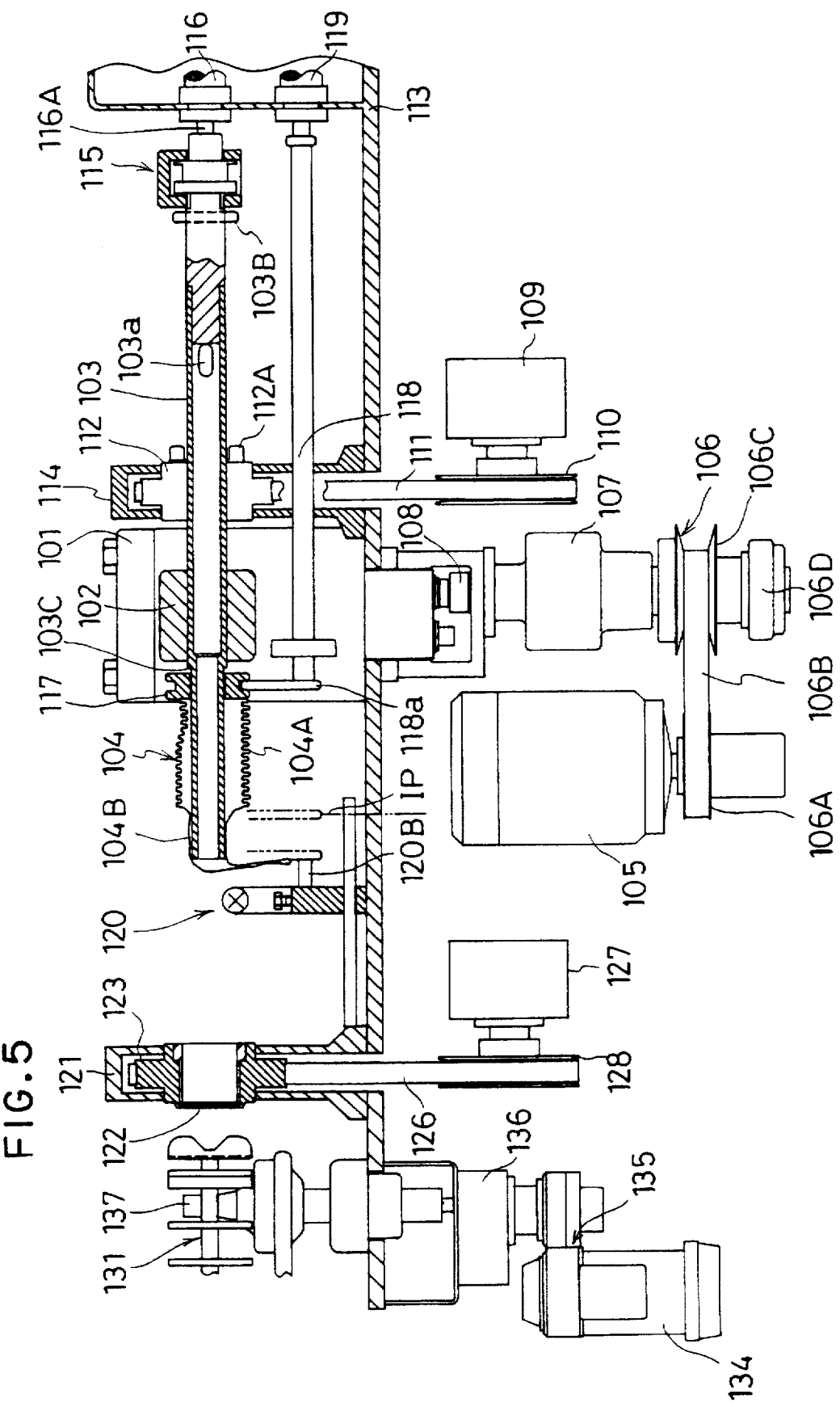

VII-VII VIEW OF (B)

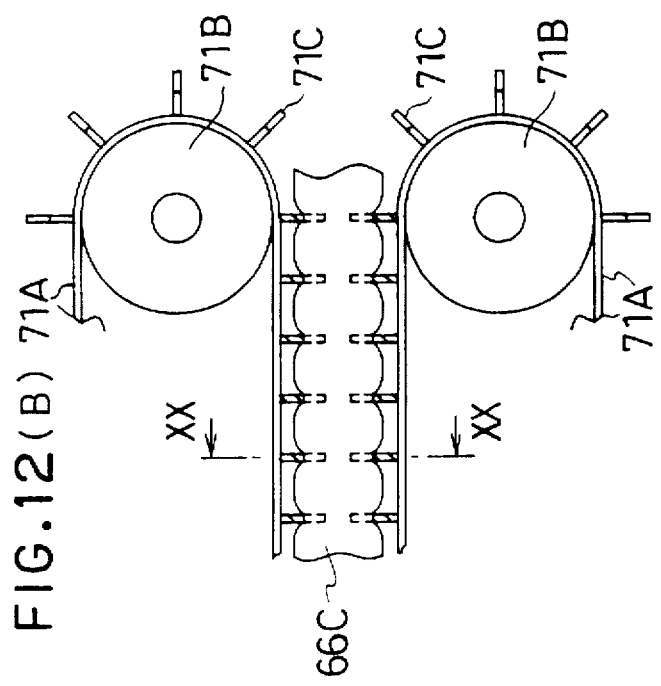
FIG.12(B)
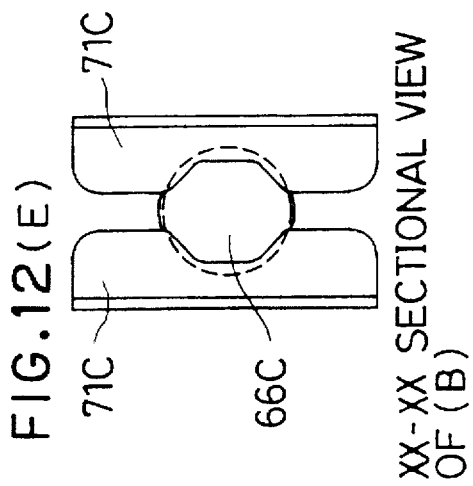
FIG.12(E) XX-XX SECTIONAL VIEW OF (B)
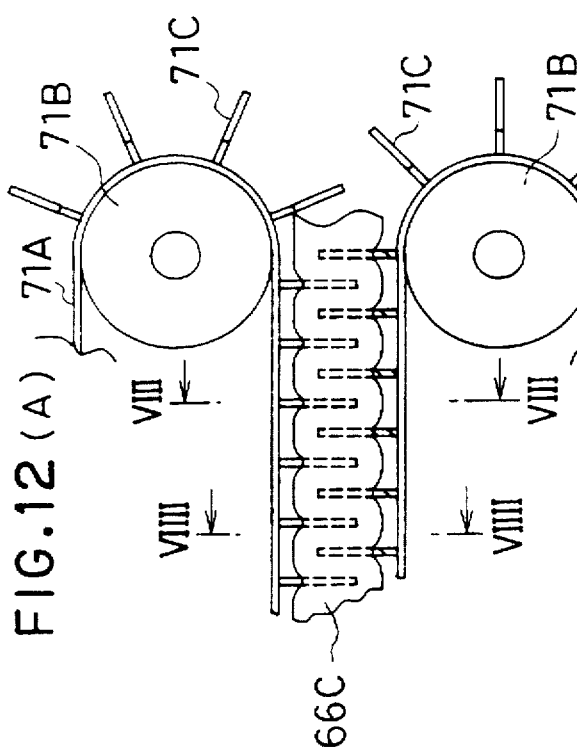
FIG.12(A)
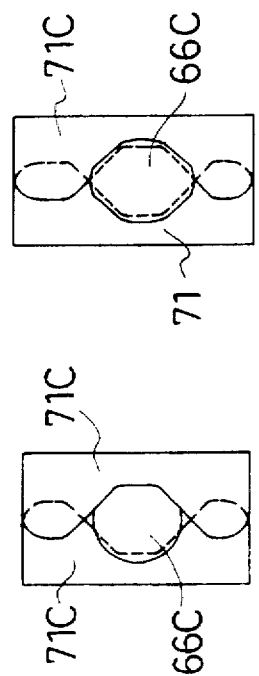
FIG.12(C) VIII-VIII SECTIONAL VIEW OF (A)
FIG.12(D) VIIII-VIIII SECTIONAL VIEW OF (A)

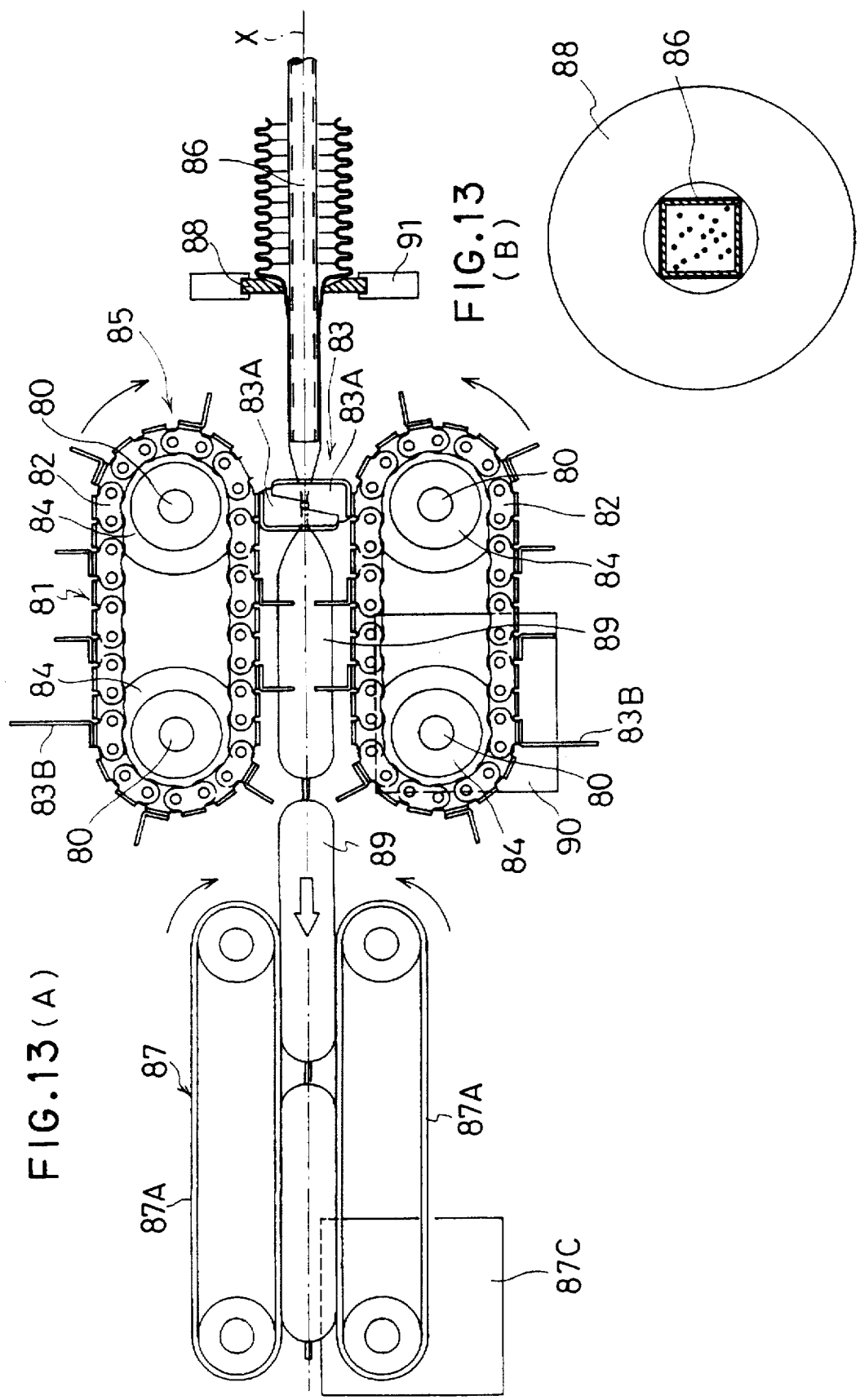

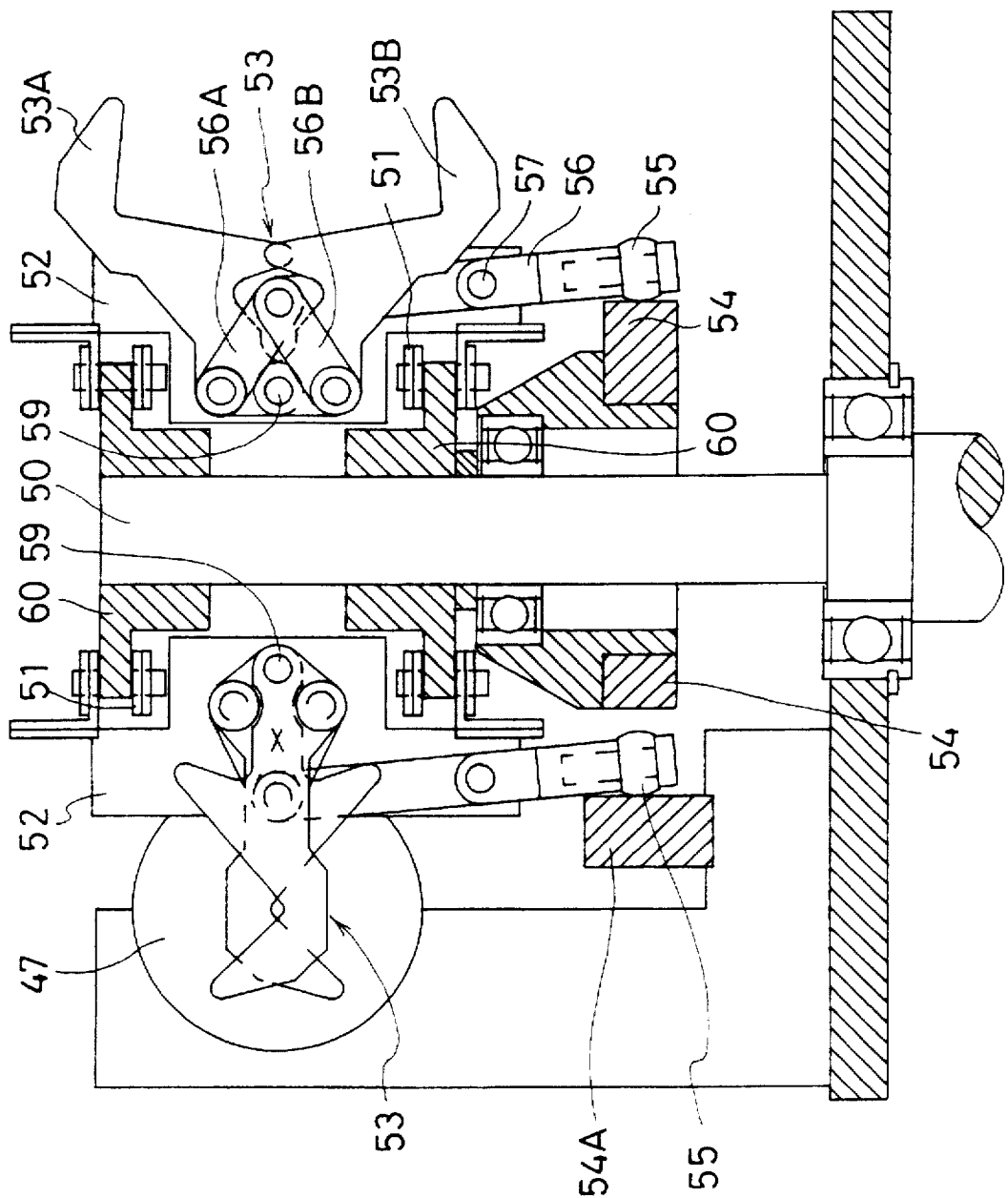

METHOD AND APPARATUS FOR MANUFACTURING CHAIN-LIKE FOOD PRODUCTS SUCH AS SAUSAGES OR THE LIKE

BACKGROUND OF THE INVENTION

1. Field of the Invention

The present invention relates to a method and an apparatus for continuously manufacturing chain-like food products such as sausages or the like by using natural intestines.

2. Description of the Related Art

Conventional chain-like sausage products are manufactured by stuffing an animal's gut, that is, a natural intestine such as a sheep's gut or a hog's gut, or an artificial casing such as a cellulose casing a collagen casing, with a stuffing material.

In this case, there are frequent occasions when the manufacturing method and apparatus differ between the case in which a natural intestine is used as the casing and the case in which an artificial casing is used.

Namely, since the natural intestine is liable to be broken when it is stuffed with the stuffing material or when the stuffed natural intestine is linked, the method and the apparatus using the natural intestine are difficult to put to practical use unless various measures are provided.

Such a problem becomes more conspicuous in the case of a so-called high-speed stuffing apparatus in which the natural intestine is stuffed with a stuffing material and is pinched.

Apparatuses for manufacturing chain-like natural-intestine sausages, which are each comprised of an endless conveyor provided with pinchers at predetermined intervals as well as a rotating stuffing nozzle, are publicly known through Japanese Patent Application Laid-Open Nos. 49-101577 and 50-91489.

In these known manufacturing apparatuses, the natural intestine fitted over the stuffing nozzle is rotated together with the rotating stuffing nozzle by increasing a frictional force acting in the rotating direction between the rotating stuffing nozzle and the natural intestine.

However, in these conventional techniques, since the natural intestine is locally engaged with the rotating stuffing nozzle or a fin head attached to a vicinity of a distal end of the rotating stuffing nozzle, there are cases where slippage occurs between the natural intestine and the rotating stuffing nozzle or fin head. Further, since the force from the rotating stuffing nozzle or the fin head is concentrated on parts of the natural intestine, breakage of the natural intestine is liable to occur when the intestine is pulled out from the rotating stuffing nozzle or the fin head.

In addition, in the manufacture of natural-intestine sausages, the membrane of the natural intestine is thin and very soft, and does not have a high shape-retaining property, and the rigidity of the stuffed natural intestine which is stuffed with the sausage material is small, with the result that a twist is liable to occur in the stuffed natural intestine at positions other than those where the stuffed natural intestine is pinched. In Japanese Patent Application Laid-Open No. 49-101577, an arrangement is provided such that after the stuffed natural intestine is pinched by the pinchers, the stuffing nozzle is rotated so as to allow a twist to be reliably produced at the pinched portion. In this case, since the stuffing nozzle rotates intermittently, and the stuffing nozzle is stopped except during the step of pinching by the pinchers, the problem that the position of a twist produced in the stuffed natural intestine is not fixed is unlikely to occur. However, since the stuffing nozzle is rotated intermittently, the rotation of the stuffing nozzle is sometimes difficult to be imparted to the natural intestine over the stuffing nozzle, so that there is the risk that a required number of twists cannot be imparted to the pinched portion. Furthermore, there are additional drawbacks in that the intermittently rotating-type stuffing nozzle, which rotates at high speed, is liable to undergo run out in the rotation of the stuffing nozzle, and lacks the durability of the apparatus.

In the sausage manufacturing apparatus disclosed in Japanese Patent Application Laid-Open No. 50-91489, a fin head, which has a hollow cylindrical portion and fins provided in such a manner as to project radially from an outer periphery of the hollow cylindrical portion, is detachably provided on the stuffing nozzle. Since the fin head expands the diameter of the natural intestine stretched from the inner side thereof, and is discontinuously and locally engaged with the stretched intestine, the twisting rigidity of the natural intestine is very low. For this reason, the rotation of the fin head is difficult to be imparted to the stuffed natural intestine portion via the stretched natural intestine portion. Since the stuffing nozzle rotates continuously, a twist can possibly occur by means of the pinchers not at the pinched portion but at a position located in front of and in proximity to a discharge end of the fin head.

Further, since this fin head is larger than the inside diameter of the natural intestine, when the natural intestine is fitted over the stuffing nozzle, the fin head must be removed from the stuffing nozzle, which is very inferior in the operating efficiency.

Further, these known manufacturing apparatuses do not solve the technical problem which is to substantially fix the stuffed diameter by using a natural intestine having a non-uniformed diameter since these known manufacturing apparatuses are aimed at a combined use for natural intestine and artificial casing.

SUMMARY OF THE INVENTION

Accordingly, the present invention is aimed at providing a method and an apparatus for manufacturing chain-like food products such as sausages or the like which are capable of overcoming the drawbacks of the above-described conventional methods and apparatuses for manufacturing sausages for exclusive use for natural intestine or the like.

Specifically, a primary object of the present invention is to provide a method and apparatus for manufacturing chain-like food products such as sausages or the like which permit high-speed production of natural intestine sausages, and which is exclusively used therefor.

A secondary object of the present invention is to provide a method and an apparatus for manufacturing chain-like food products such as sausages or the like which permit high-speed production of novel natural-intestine sausage products which have good shapes and which are substantially fixed in the length, the stuffed diameter, the stuffed weight, and the stuffed tension even if a natural intestine having an nonuniform diameter is used as a casing.

A third object of the present invention is to provide a method and an apparatus for manufacturing chain-like food products such as sausages or the like which make it possible to reliably impart the rotation of the stuffing nozzle to a straightened natural intestine portion fitted over the stuffing nozzle.

A fourth object of the present invention is to provide a method and an apparatus for manufacturing chain-like food products such as sausages or the like which make it possible to produce a twist only at the position in the stuffed natural intestine pinched by pinchers.

A fifth object of the present invention is to provide a method and an apparatus for manufacturing chain-like food products such as sausages or the like which make it possible to prevent breakage of the natural intestine or an untwisting at the pinched portion.

A sixth object of the present invention is to provide a method and an apparatus for manufacturing chain-like food products such as sausages or the like which excel in the stuffing work efficiency.

In accordance with a first aspect of the present invention, there is provided a method for manufacturing chain-like food products such as sausages or the like, comprising the steps of: pinching a stuffed natural intestine portion; pulling the stuffed natural intestine portion so as to reduce the diameter of an inner peripheral surface of an unstuffed straightened natural intestine portion following the stuffed natural intestine portion; and supplying a stuffing material into the unstuffed straightened natural intestine portion to form the stuffed natural intestine portion, holding in a cylindrical shape the inner peripheral surface of the unstuffed straightened natural intestine portion with the diameter thereof reduced, imparting a rotational force to the inner peripheral surface of the unstuffed straightened natural intestine portion held in the cylindrical shape so as to rotate the stuffed natural intestine portion preceding the unstuffed straightened natural intestine portion via the unstuffed straightened natural intestine portion, and forming a twist at a pinched position of the stuffed natural intestine portion.

In accordance with a second aspect of the present invention, there is provided an apparatus for manufacturing chain-like food products such as sausages or the like, comprising: means for pinching a stuffed natural intestine portion and pulling the stuffed natural intestine portion so as to reduce the diameter of an inner peripheral surface of an unstuffed straightened natural intestine portion following the stuffed natural intestine portion; and means for supplying a stuffing material into the unstuffed straightened natural intestine portion to form the stuffed natural intestine portion, for holding in a cylindrical shape the inner peripheral surface of the unstuffed straightened natural intestine portion with the diameter thereof reduced, for imparting a rotational force to the inner peripheral surface of the unstuffed straightened natural intestine portion held in the cylindrical shape so as to rotate the stuffed natural intestine portion preceding the unstuffed straightened natural intestine portion via the unstuffed straightened natural intestine portion, and for forming a twist at a pinched position of the stuffed natural intestine portion.

In accordance with a third aspect of the present invention, there is provided a method for manufacturing chain-like food products such as sausages or the like, comprising the steps of: discharging a stuffing material from a distal end of a stuffing nozzle into a straightened natural intestine portion to form a stuffed natural intestine portion forwardly of the distal end of the stuffing nozzle; pulling the stuffed natural intestine portion by moving the stuffed natural intestine portion forwardly of the distal end of the stuffing nozzle to reduce the diameter of an ensuing straightened natural intestine portion so as to cause the straightened natural intestine portion to come into contact with an outer periphery of the stuffing nozzle, and rotating the stuffing nozzle with which the straightened natural intestine portion is brought into contact, so as to rotate the stuffed natural intestine portion; and pinching the stuffed natural intestine portion and forming a twist at a pinched position thereof, wherein the discharge of the stuffing material into the straightened natural intestine portion is effected while the stuffed natural intestine portion and the straightened natural intestine portion are being moved.

In accordance with a fourth aspect of the present invention, there is provided an apparatus for manufacturing chain-like food products such as sausages or the like, comprising: a stuffing nozzle for forming a stuffed natural intestine portion forwardly of a distal end of the stuffing nozzle by discharging a stuffing material from the distal end of the stuffing nozzle into a straightened natural intestine portion; and means for pulling the stuffed natural intestine portion forwardly of the distal end of the stuffing nozzle to reduce the diameter of an ensuing straightened natural intestine portion so as to cause the straightened natural intestine portion to come into contact with an outer periphery of the stuffing nozzle, for rotating the stuffing nozzle with which the straightened natural intestine portion is brought into contact, so as to rotate the stuffed natural intestine portion, and for pinching the stuffed natural intestine portion so as to form a twist therein.

In accordance with a fifth aspect of the present invention, there is provided an apparatus for manufacturing chain-like food products such as sausages or the like, comprising: a rotatable stuffing nozzle over which a natural intestine sectioned into a straightened natural intestine portion and a shirred natural intestine portion is fitted, the stuffing nozzle being capable of stuffing an interior of the straightened natural intestine portion with a stuffing material; a pinching device having a pincher for pinching the stuffed natural intestine portion stuffed with the stuffing material by the stuffing nozzle and moving means for moving the pincher, so as to reduce the diameter of the straightened natural intestine portion fitted over the stuffing nozzle as the stuffed natural intestine portion is pulled by the pincher; and nozzle rotating means for rotating the stuffing nozzle with which the straightened natural intestine portion with its diameter reduced is brought into contact, so as to rotate the stuffed natural intestine portion and impart a twist to a pinched portion of the stuffed natural intestine portion pinched by the pincher.

In accordance with a sixth aspect of the present invention, in the apparatus for manufacturing chain-like food products such as sausages or the like according to the fifth aspect of the present invention, the pincher consists of a pair of pincher members, and a center of movement of the pair of pincher members is located laterally of an extension of an axis of the stuffing nozzle such that the pair of pincher members moves from a rearward region located rearwardly of a distal end of the stuffing nozzle toward a forward region located forwardly thereof.

In accordance with a seventh aspect of the present invention, there is provided an apparatus for manufacturing chain-like food products such as sausages or the like, comprising: a rotatable stuffing nozzle over which a natural intestine sectioned into a straightened natural intestine portion and a shirred natural intestine portion is fitted, the stuffing nozzle being capable of stuffing an interior of the straightened natural intestine portion with a stuffing material; a conveying device for conveying at a predetermined speed the stuffed natural intestine portion stuffed with the stuffing material by the stuffing nozzle while nipping the stuffed natural intestine, for pulling the straightened natural intestine portion being pulled out from the stuffing nozzle by the conveyance, so as to reduce the diameter of the straightened natural intestine portion and cause the straightened natural intestine portion to be brought into contact with an outer periphery of the stuffing nozzle; a pinching device having a pincher for pinching the stuffed natural intestine portion and moving means for moving the pincher; and nozzle rotating means for rotating the stuffing nozzle with which the straightened natural intestine portion with its diameter reduced is brought into contact, so as to rotate the stuffed natural intestine portion and impart a twist to a pinched portion of the stuffed natural intestine portion pinched by the pincher.

In accordance with an eighth aspect of the present invention, in the apparatus for manufacturing chain-like food products such as sausages or the like according to the seventh aspect of the present invention, the pincher consists of a pair of pincher members, and a center of movement of the pair of pincher members is located laterally of an extension of an axis of the stuffing nozzle such that the pair of pincher members moves from a rearward region located rearwardly of a distal end of the stuffing nozzle toward a forward region located forwardly thereof.

In accordance with a ninth aspect of the present invention, in the apparatus for manufacturing chain-like food products such as sausages or the like according to the fifth aspect of the present invention.

In accordance with a ninth aspect of the present invention, the apparatus for manufacturing chain-like food products such as sausages or the like according to any one of the fourth, fifth, and seventh aspects of the present invention further comprises: an engaging member through which the stuffing nozzle is inserted and which engages the natural intestine which is fitted over the stuffing nozzle.

In accordance with a 10th aspect of the present invention, the apparatus for manufacturing chain-like food products such as sausages or the like according to the ninth aspect of the present invention further comprises: a rotatively driving mechanism for rotating the engaging member about an axis of the stuffing nozzle.

In accordance with an 11th aspect of the present invention, the apparatus for manufacturing chain-like food products such as sausages or the like according to the fifth or seventh aspect of the present invention further comprises: a natural-intestine pushing member for pushing the shirred natural intestine portion fitted over the stuffing nozzle toward the distal end of the stuffing nozzle, so as to reduce the length of the straightened natural intestine portion.

In accordance with a 12th aspect of the present invention, in the apparatus for manufacturing chain-like food products such as sausages or the like according to the 11th aspect of the present invention, the pushing of the shirred natural intestine portion by the natural-intestine pushing member is effected in steps.

In accordance with a 13th aspect of the present invention, in the apparatus for manufacturing chain-like food products such as sausages or the like according to the any one of the fifth to eighth aspects of the present invention, the pincher has a pair of pincher members which are provided symmetrically about an extension of the axis of the stuffing nozzle, and the moving means is adapted to move each of the pincher members.

In accordance with a 14th aspect of the present invention, in the apparatus for manufacturing chain-like food products such as sausages or the like according to the fifth or sixth aspect of the present invention, the pincher has a pair of pincher members which are capable of opening and closing and are provided laterally of an extension of the axis of the stuffing nozzle, and the pair of pincher members are provided on the moving means.

In accordance with a 15th aspect of the present invention, the apparatus for manufacturing chain-like food products such as sausages or the like according to the fifth or seventh aspect of the present invention further comprises: a stuffing pump for supplying the stuffing material into the stuffing nozzle; a stuffing-pump driving mechanism for driving the stuffing pump and having speed changing means for changing a pumping speed of the stuffing pump; and a pinching-device driving mechanism for driving the pinching device and having speed changing means for changing a moving speed of the pincher.

In accordance with a 16th aspect of the present invention, in the apparatus for manufacturing chain-like food products such as sausages or the like according to the fifth or seventh aspect of the present invention, the nozzle rotating means has speed changing means for changing a nozzle rotating speed.

In accordance with a 17th aspect of the present invention, the apparatus for manufacturing chain-like food products such as sausages or the like according to the fifth or seventh aspect of the present invention further comprises: a stuffing pump for supplying the stuffing material into the stuffing nozzle; a motor for driving the stuffing pump; and a motor for driving the pinching device, wherein the nozzle rotating means has a motor for rotating the stuffing nozzle, and the motor for driving the stuffing pump, the motor for rotating the stuffing nozzle, and the motor for driving the pinching device are respectively independently provided.

In accordance with an 18th aspect of the present invention, in the apparatus for manufacturing chain-like food products such as sausages or the like according to the 17th aspect of the present invention, a pumping speed of the stuffing pump, a rotating speed of the stuffing nozzle, and a pincher moving speed of the pinching device are respectively independently changeable.

In accordance with a 19th aspect of the present invention, the apparatus for manufacturing chain-like food products such as sausages or the like according to the fifth or seventh aspect of the present invention further comprises: a stuffing pump for supplying the stuffing material into the stuffing nozzle; a motor for driving the stuffing pump; an engaging member through which the stuffing nozzle is inserted and which engages the natural intestine fitted over the stuffing nozzle; a motor for rotating the engaging member; and a motor for driving the pinching device, wherein the motor for driving the stuffing pump, the motor for rotating the engaging member, and the motor for driving the pinching device are respectively independently provided.

In accordance with a 20th aspect of the present invention, in the apparatus for manufacturing chain-like food products such as sausages or the like according to the 19th aspect of the present invention, a pumping speed of the stuffing pump, a rotating speed of the engaging member, and a pincher moving speed of the pinching device are respectively independently changeable.

In accordance with a 21th aspect of the present invention, the apparatus for manufacturing chain-like food products such as sausages or the like according to the fifth or seventh aspect of the present invention further comprises: detecting means for detecting a change in a shape of the shirred natural intestine portion; a stuffing pump for supplying the stuffing material into the stuffing nozzle; and a stuffing-pump driving mechanism for driving the stuffing pump, wherein the stuffing-pump driving mechanism is adapted to stop the driving of the stuffing pump by means of a signal from the detecting means.

In accordance with a 22nd aspect of the present invention, there is provided a method for manufacturing chain-like food products such as sausages or the like, comprising the steps of: sectioning a natural intestine fitted over a stuffing nozzle into a shirred natural intestine portion and a straightened natural intestine portion; discharging a stuffing material from a distal end of the stuffing nozzle into the straightened natural intestine portion to form a stuffed natural intestine portion forwardly of the distal end of the stuffing nozzle; and pinching the stuffed natural intestine portion, pulling the stuffed natural intestine portion by moving the stuffed natural intestine portion forwardly of the distal end of the stuffing nozzle via a pinched position of the stuffed natural intestine portion to reduce the diameter of the straightened natural intestine portion so as to cause the straightened natural intestine portion to come into contact with an outer periphery of the stuffing nozzle, rotating the stuffing nozzle with which the straightened natural intestine portion is brought into contact, so as to rotate the stuffed natural intestine portion, and forming a twist at a pinched position of the rotated stuffed natural intestine portion, wherein the discharge of the stuffing material into the straightened natural intestine portion is effected while the stuffed natural intestine portion and the straightened natural intestine portion are being moved.

In accordance with a 23rd aspect of the present invention, there is provided a method for manufacturing chain-like food products such as sausages or the like, comprising the steps of: sectioning a natural intestine fitted over a stuffing nozzle into a shirred natural intestine portion and a straightened natural intestine portion; discharging a stuffing material from a distal end of the stuffing nozzle into the straightened natural intestine portion to form a stuffed natural intestine portion forwardly of the distal end of the stuffing nozzle; nipping the stuffed natural intestine portion, pulling the stuffed natural intestine portion by moving the stuffed natural intestine portion forwardly of the distal end of the stuffing nozzle to reduce the diameter of the straightened natural intestine portion so as to cause the straightened natural intestine portion to come into contact with an outer periphery of the stuffing nozzle, rotating the stuffing nozzle with which the straightened natural intestine portion is brought into contact, so as to rotate the stuffed natural intestine portion; and pinching the stuffed natural intestine portion being rotated and moved and forming a twist therein, wherein the discharge of the stuffing material into the straightened natural intestine portion is effected while the stuffed natural intestine portion and the straightened natural intestine portion are being moved.

In accordance with the method and the apparatus for manufacturing chain-like food products such as sausages or the like which take advantage of expanding characteristics of a natural intestine, that is, an animal's gut in accordance with the present invention, the following advantages are offered:

First, it is possible to manufacture at high speed natural intestine sausages in which variations in the stuffed diameter and the stuffed tension are small.

Second, it is possible to manufacture at high speed novel substantially-fixed-length, substantially-fixed-volume products which have good shapes and in which variations in the stuffed diameter and the stuffed tension are small, although they are natural-intestine sausages.

Third, the need for selectively using natural intestines in which variation in the diameter is small is reduced, thereby making it possible to effect a reduction in the cost of natural intestines.

Fourth, since the straightened natural intestine portion rotates integrally with the stuffing nozzle, the straightened natural intestine portion is prevented from being excessively wound around the stuffing nozzle, thereby also reducing the breakage of the natural intestine.

Fifth, a twisted portion is formed reliably as the stuffed natural intestine is placed at the pincher, so that the defective rate of the products can be reduced, thereby improving the yield of intestines used.

Sixth, breakage due to squeezing the stuffed natural intestine is reduced when the stuffed natural intestine is pinched by the pincher.

Seventh, the rotation is transmitted reliably to the pinched portion of the stuffed natural intestine via the stuffed natural intestine and the straightened natural intestine portion which is stretched by the rotation of the stuffing nozzle. Accordingly, variations in the number of twists is reduced, and the unwinding of the twist is also reduced.

Eighth, since it is possible to use a stuffing nozzle whose diameter is smaller than the diameter of the shirred natural intestine portion, the fitting of the natural intestine over the stuffing nozzle is facilitated, thereby reducing the operating time.

The above and other objects, features and advantages of the present invention will become more apparent from the following detailed description of the invention when read in conjunction with the accompanying drawings.

BRIEF DESCRIPTION OF THE DRAWINGS

FIGS. 2A to 2C are diagrams illustrating partial structures of a stuffing device shown in FIG. 1, in which FIG. 2A is a detailed diagram of a pincher, FIG. 2B is a cross-sectional view illustrating a stuffing nozzle and a straightened natural intestine portion; and FIG. 2C is a cross-sectional view illustrating the stuffing nozzle and a shirred natural intestine portion;

FIGS. 3A to 3E are cross-sectional views illustrating the shapes of the stuffing nozzle which is used as the stuffing nozzle in FIG. 1;

FIGS. 4A to 4C are diagrams illustrating other examples of the shape of the stuffing nozzle;

FIG. 5 is partly cutaway front elevational view illustrating the method and the apparatus for continuously manufacturing chain-like food products such as sausages or the like in accordance with another embodiment of the present invention;

FIGS. 12A to 12E are diagrams illustrating the shape of the cross section of a stuffed natural intestine pinched by lugs;

FIG. 13A is a partly cutaway front elevational view illustrating a still further embodiment of the present invention;

FIG. 13B is a cross-sectional view of the stuffing nozzle and a braking member shown in FIG. 13A;

FIG. 15 is a partly cutaway side elevational view of FIG. 14.

DESCRIPTION OF THE PREFERRED EMBODIMENTS

Figure 1:
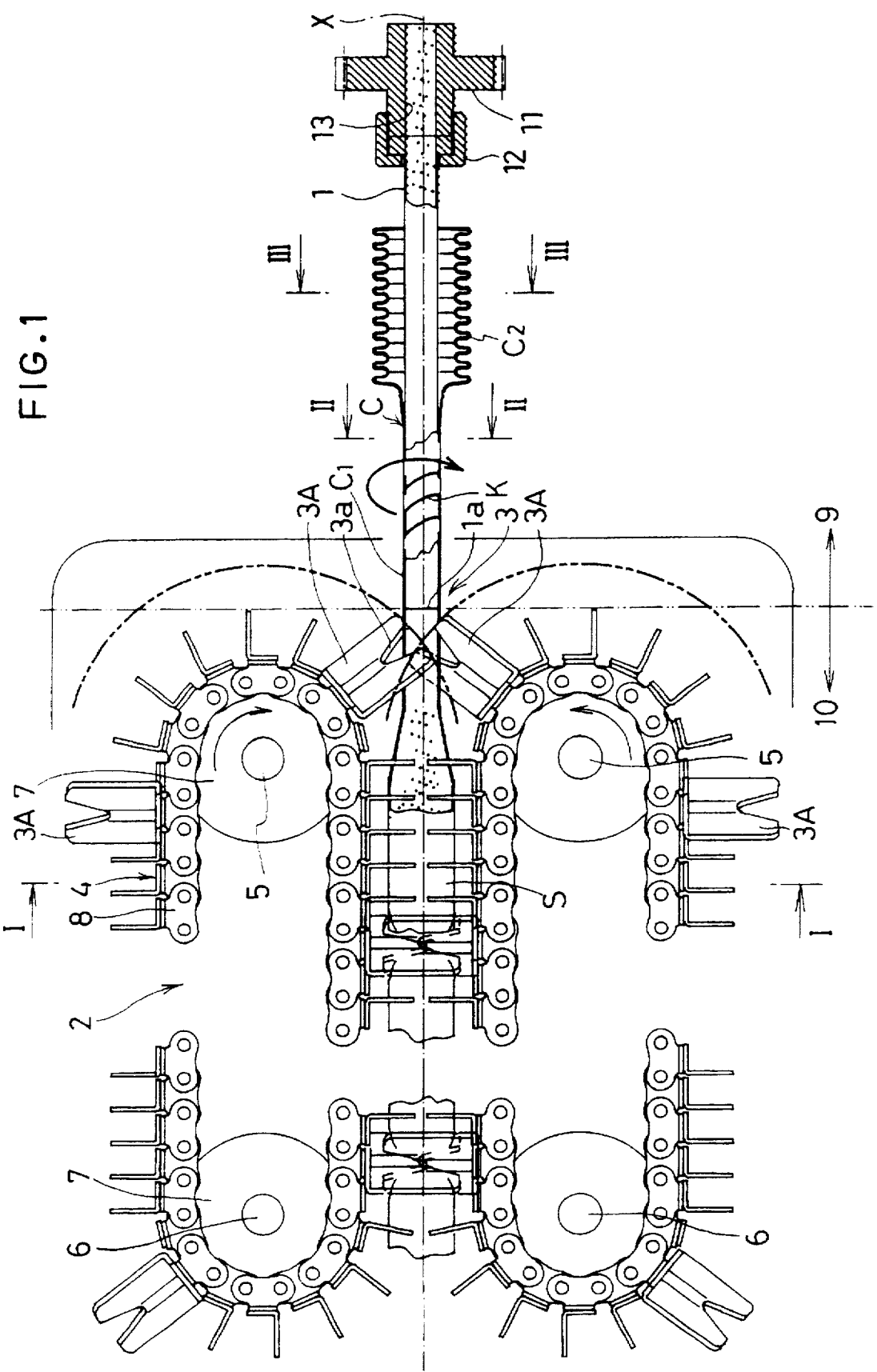
FIG. 1 is a partly cutaway plan view illustrating a method and an apparatus for continuously manufacturing chain-like food products such as sausages or the like in accordance with an embodiment of the present invention.

Referring now to FIG. 1, a description will be given of an embodiment of the present invention.

Reference numeral 1 denotes a stuffing nozzle, and a natural intestine C, which is sectioned into a straightened natural intestine portion $C_1$ and a shirred natural intestine portion $C_2$, is fitted over the stuffing nozzle 1. The shirred natural intestine portion is a portion wherein the natural intestine is shirred in the longitudinal direction to be in a bellows shaped state. The straightened natural intestine portion is a portion wherein the natural intestine is straightened in the longitudinal direction to be in a straight state. The stuffing nozzle 1 receives a stuffing material fed out from a stuffing pump (not shown) for continuously supplying the stuffing material, and discharges the same from a distal end thereof.

The stuffing nozzle is provided in such a manner as to be capable of continuously rotating about an axis X, and has an identical cross section of a round pipe over the length of the stuffing nozzle.

Reference numeral 2 denotes a pinching device which pinches a stuffed natural intestine S stuffed with the stuffing material, and conveys the stuffed natural intestine S forwardly of the stuffing nozzle. The pinching device 2 is comprised of pinchers 3, which are constituted by pairs of pincher members 3A for pinching the stuffed natural intestine by coming to oppose each other, as well as a wrapping connector means 4 serving as a moving means for continuously moving the pinchers 3.

The wrapping connector means 4 is constituted by two pairs of shafts 5 and 6 and a pair of endless chains 8 each trained between a pair of sprockets 7. The shaft 5 serving as a center of movement of the pincher members 3A is located laterally of the axis X of the stuffing nozzle 1 and in a forward region 10 located forwardly of a distal end 1a of the stuffing nozzle, such that the pincher members 3A move from a rearward region 9 located rearwardly of the distal end 1a toward the forward region 10.

Figure 2:
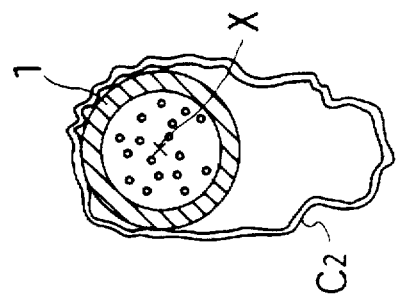
Figure 2:
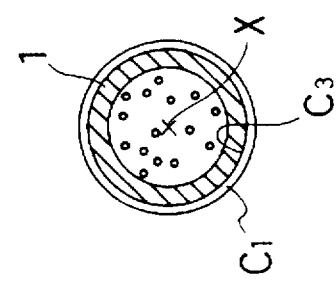
Figure 2:
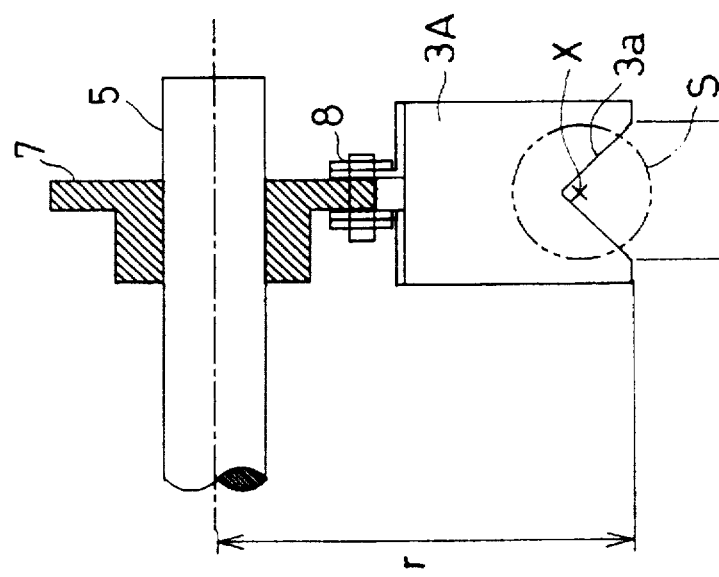

Referring also to FIG. 2A, each pincher member 3A is provided with a V-shaped notched portion 3a, and the dimension d of the opening in the notched portion 3a is set to a size greater than the outside diameter of the stuffed natural intestine S, while the radius r of the opening is set to be greater than the distance between the distal end of the stuffing nozzle 1 and the shaft 5.

Reference numeral 11 denotes a driving mechanism serving as a nozzle rotating means, and the driving mechanism 11 is driven by an unillustrated motor to rotatively drive the stuffing nozzle 1. The stuffing nozzle 1 is attached to the driving mechanism 11 by means of a nut 12, and the driving mechanism 11 is provided with a stuffing-material passage hole 13 which extends in the direction of the axis X and penetrates the driving mechanism 11.

A description will be given of the operation of the apparatus for manufacturing chain-like food products such as sausages or the like which is arranged as described above in accordance with one embodiment of the present invention.

The natural intestine C is fitted over the stuffing nozzle 1, the shirred natural-intestine portion $C_2$ is manually pulled out forwardly of the stuffing nozzle 1 to form the straightened natural-intestine portion $C_1$ over the stuffing nozzle 1. At the same time, a predetermined length of the straightened natural-intestine portion $C_1$ is allowed to be suspended from the distal end 1a.

When the operation of the apparatus is started, the stuffing material is continuously discharged into the straightened natural-intestine portion $C_1$ suspended from the distal end 1a of the stuffing nozzle from the distal end of the stuffing nozzle 1. The stuffed natural intestine S thus formed moves toward the pinching device 2 while pulling out the straightened natural-intestine portion $C_1$ over the stuffing nozzle 1 owing to the stuffing pressure.

The notched portions 3a of the pinchers 3 of the pinching device 2 are moved toward the forward region located forwardly of the distal end 1a of the stuffing nozzle in such a manner as to be brought into close proximity to an outer periphery of the straightened natural-intestine portion $C_1$ fitted over the stuffing nozzle 1, and starts to pinch the stuffed natural intestine S at a position close to the distal end 1a of the stuffing nozzle. The pincher members 3A continue their movement with the respective shafts 5 as their centers, and after completing the pinching of the stuffed natural intestine S, the pincher members 3A pull and convey the stuffed natural intestine S along the axis X while maintaining the pinching state. Since the stuffed natural intestine S is pulled and conveyed by the pinchers 3, the straightened natural intestine portion $C_1$ over the stuffing nozzle 1 moves to pull the shirred natural intestine portion $C_2$ while it is being stretched in the direction of the axis X, and the shirred natural intestine portion $C_2$ becomes the straightened natural intestine portion $C_1$ while it is being stretched to have its diameter reduced. Hereafter, the reduction of the diameter of the natural intestine will be referred to as "the reduced diameter". While the straightened natural intestine portion $C_1$ formed over the stuffing nozzle 1 along the axis X strengthens its degree of contact with the outer periphery of the stuffing nozzle 1 since the straightened natural intestine portion is always being pulled, and rotates together with the stuffing nozzle 1, the straightened natural intestine portion $C_1$ is pulled out from the distal end 1a of the stuffing nozzle. The stuffed natural intestine S is rotatively driven by the straightened natural intestine portion $C_1$ which continuously rotates together with the stuffing nozzle 1, with the result that a continuous twisting is imparted to the natural intestine at the position pinched by the aforementioned pinchers 3. A rotating force from the stuffing nozzle 1 is imparted to an inner peripheral surface $C_3$ of the straightened natural intestine portion $C_1$ brought into contact with the outer periphery of the stuffing nozzle 1. If this contact is set in a state of close contact, the rotation of the stuffing nozzle 1 is liable to be imparted more positively.

The aforementioned twisting of the natural intestine is continued until an ensuing pinching by the ensuing pinchers 3 is completed. The pinchers 3 continue to move continuously at a fixed speed, the stuffing pump continuously discharges the stuffing material into the straightened natural intestine portion $C_1$ pulled out from the distal end $1a$ of the stuffing nozzle, thereby forming the stuffed natural intestine S. The pinchers 3 continuously move at a fixed speed, and a fixed amount of stuffing material is continuously discharged into the straightened natural intestine portion $C_1$ which moves while a stretching force to reduce its diameter due to being stretched by the pinchers 3 is applied to the straightened natural intestine portion $C_1$. For this reason, the stuffed natural intestine S having small variations in the stuffed diameter are formed. The ensuing pinchers 3 which are provided on the respective chains 8 at a predetermined interval start to pinch the stuffed natural intestine S at a position close to the distal end $1a$ of the stuffing nozzle. Since the stuffed diameter of the stuffed natural intestine S which is at a position close to the distal end $1a$ of the stuffing nozzle is still small, the twist can be easily produced, and since the position where the twist is produced is close to the distal end $1a$ of the stuffing nozzle, the rotation of the straightened natural intestine portion $C_1$ over the stuffing nozzle 1 is easily imparted at the position where the twist is produced. Hence, a sufficient twist can be reliably imparted to the position of pinching by the pinchers 3. The pinchers 3 may pinch a larger portion of the stuffed natural intestine than the outside diameter of the stuffing nozzle 1, the larger portion occurring in relation to the conveying speed of the stuffed natural intestine 5 by the pinchers 3 and the amount of the discharged stuffing material (refer to FIG. 4).

Referring to FIG. 2C, in the nonrotated state of the stuffing nozzle 1, the shirred natural-intestine portion $C_2$ fitted over the stuffing nozzle 1 is in a bellows shaped state being compressed in the direction of the axis X, and is suspended from the stuffing nozzle. The inside diameter of the shirred natural-intestine portion $C_2$ is generally sufficiently larger than the outside diameter of the stuffing nozzle 1.

Referring to FIG. 2B, the straightened natural intestine portion $C_1$ over the rotating stuffing nozzle 1 is stretched in the direction of the axis X and its diameter is reduced as described above, and the straightened natural intestine portion $C_1$ is substantially brought into close contact with the outer periphery of the stuffing nozzle 1. The straightened natural intestine portion $C_1$ suffices if the inner peripheral surface $C_3$ of the straightened natural intestine portion $C_1$ on the whole is in contact with the stuffing nozzle 1, even if there may be a slight gap locally with the outer periphery of the stuffing nozzle 1 or overlapping portions of the membrane.

Returning to FIG. 1, the straightened natural intestine portion $C_1$, which moves toward the distal end $1a$ of the stuffing nozzle while receiving a braking force from the rotating stuffing nozzle 1, rotatively drives the stuffed natural intestine S. As a result, a twist K is produced in such a manner as to allow the straightened natural intestine portion $C_1$ to be wound around the outer periphery of the stuffing nozzle 1, thereby increasing the closely contacting force.

The straightened natural intestine portion $C_1$ is brought into uniform contact, preferably close contact with the outer periphery of the stuffing nozzle 1 with a uniform shape along the axis X. Even if the straightened natural intestine portion $C_1$ receives a braking force from the stuffing nozzle 1 necessary for rotatively driving the stuffed natural intestine S, the straightened natural intestine portion $C_1$ slips over the outer periphery of the stuffing nozzle 1 without undergoing breakage, and is pulled out from the distal end $1a$ of the stuffing nozzle.

As the straightened natural intestine portion $C_1$ is pulled out, the length of the straightened natural intestine portion $C_1$ over the stuffing nozzle 1 from the distal end $1a$ of the stuffing nozzle increases. In a case where the contact length in the direction of the axis X needs to be maintained within a desired range, the trailing end of the shirred natural-intestine portion $C_2$ is pushed toward the distal end $1a$ of the stuffing nozzle.

In the case of the natural intestine used, e.g., a sheep's gut, its length is, for example, 8 m per piece, and its diameter changes from 18 mm to 20 mm over its entire length. In a case where the natural intestine C is to be further reduced in relation to the diameter of the stuffing nozzle 1, this adjustment can be attained by increasing the braking force on the natural intestine C by using a braking member serving as an engaging member in the apparatus of the embodiment, which will be described later. Depending on the difficulty of producing the twist in the stuffed natural intestine S (the type of natural intestine, the state of the natural intestine, the size of the stuffed natural intestine, etc.), the distal end $1a$ of the stuffing nozzle is disposed in such a manner as to located farther from or more closely toward the pinching device 2 than the illustrated position. In the case of the more closely disposed position, the distal end $1a$ of the stuffing nozzle is located in the notched portions $3a$ of the pinchers 3 which move from the rearward region located rearwardly of the distal end $1a$ of the stuffing nozzle toward the forward region located forwardly thereof. Therefore, the position where the pinching of the stuffed natural intestine S by the notched portions $3a$ is started is located more closely to the distal end $1a$ of the stuffing nozzle, with the result that the production of the twist is more facilitated.

Referring to FIGS. 3A to 3E, in the present invention it is possible to use the stuffing nozzle 1 whose outer peripheral shape varies.

For example, the cross-sectional shape of the stuffing nozzle 1 may not necessarily be circular, but be elliptical, as shown in FIG. 3A.

In addition, it is possible to use a triangular shape as shown in FIG. 3B, a square or rectangular shape as shown in FIG. 3C, a pentagonal shape as shown in FIG. 3D, or a polygonal shape such as a hexagonal shape as shown in FIG. 3E.

If the stuffing nozzle 1 is provided with one of the cross-sectional shapes such as those shown in FIGS. 3A to 3E, the slippage of the straightened natural intestine portion $C_1$ with respect to the stuffing nozzle 1 in the rotational direction can be reduced.

Further, the stuffing nozzle 1 may be provided with an outer peripheral shape in which, as shown in FIG. 4A, a multiplicity of (in this example, 10) grooves 1S are formed on the outer periphery of the stuffing nozzle 1 along the longitudinal direction thereof (the direction of the axis X), an outer peripheral shape in which, as shown in FIG. 4B, protrusions 1T are provided on the outer periphery of the stuffing nozzle 1 along the longitudinal direction thereof, or an outer peripheral shape in which, as shown in FIG. 4C, four flat portions 1S' are provided on the outer periphery of the stuffing nozzle 1 along the longitudinal direction thereof. In the stuffing nozzle 1 having any one of these outer peripheral shapes, as the straightened natural intestine portion $C_1$ is stretched, the diameter (18 to 20 mm) of the natural intestine is reduced to the outside diameter of the stuffing nozzle 1, e.g., 10 mm, the shirred natural intestine portion $C_2$ becomes the straightened natural intestine portion $C_1$ to be brought into contact with the outer periphery of the stuffing nozzle 1.

It should be noted that if the stuffing nozzle 1 is provided with one of the shapes such as those shown in FIGS. 4A to 4C, the slippage of the straightened natural intestine portion C₁ with respect to the stuffing nozzle 1 in the rotational direction can be reduced.

It should be noted that the wrapping connector means of the pinching device is not limited to the arrangement of the sprockets and the chains as illustrated in the drawings, and it is possible to use a known wrapping connector means such as timing pulleys and timing belts.

Next, referring to FIGS. 5 to 8B, a description will be given of another embodiment of the present invention.

Figure 6:
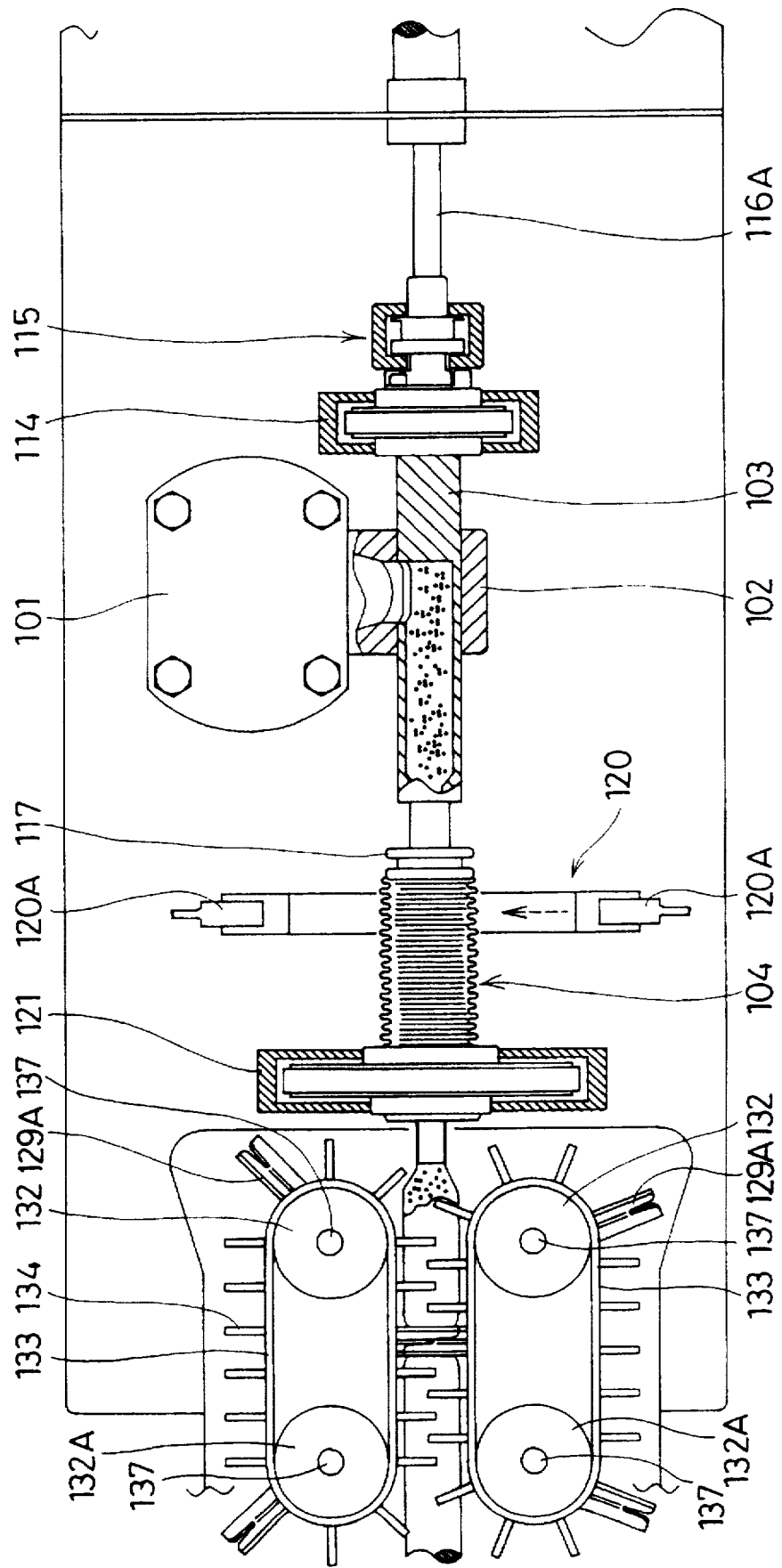
FIG. 6 is a partly cutaway plan view of FIG. 5.
Figure 7:
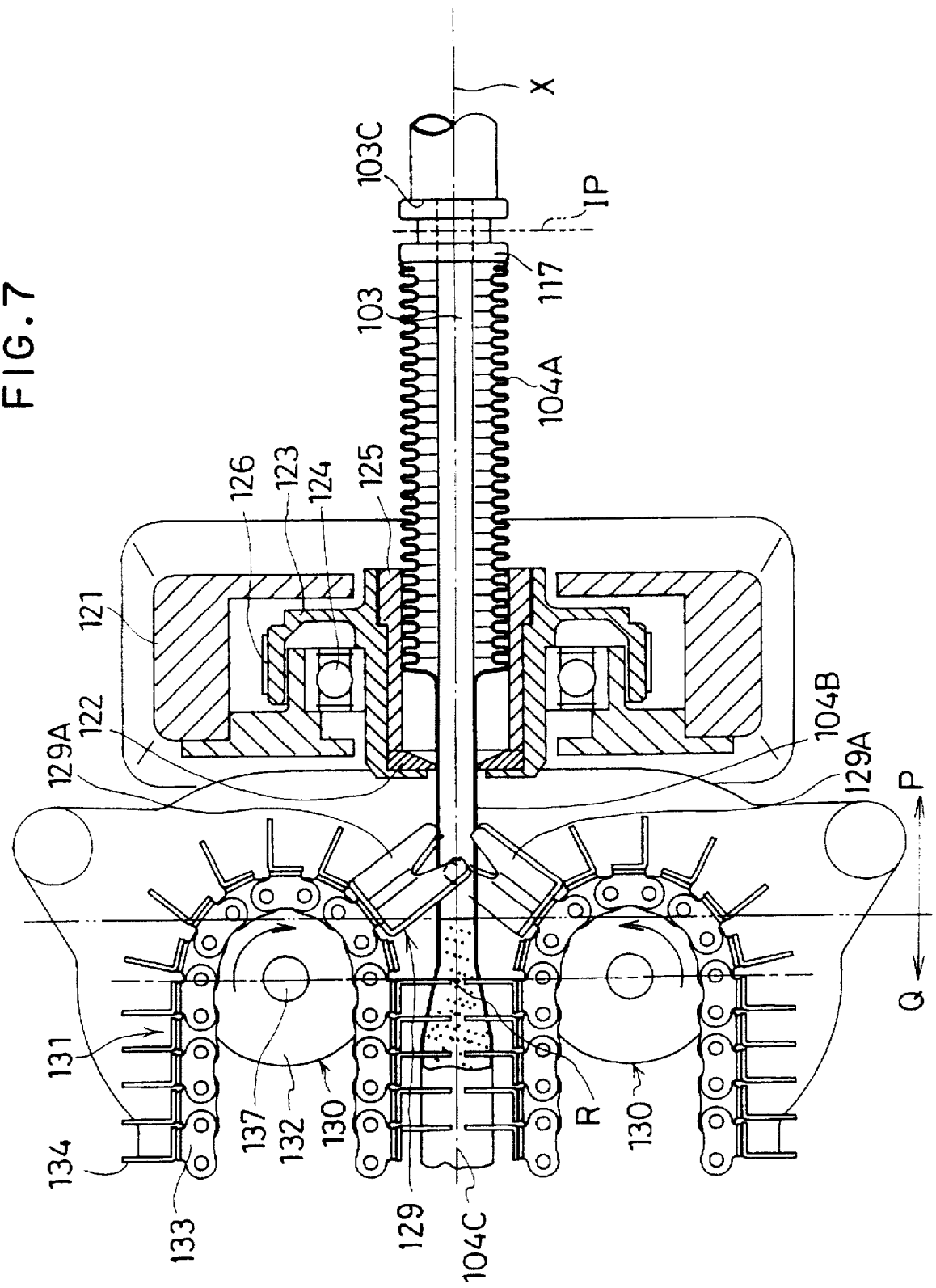
FIG. 7 is an enlarged cross-sectional plan view of the stuffing nozzle, the braking member, and the pinchers which are shown in FIGS. 5 and 6.
Figure 8:
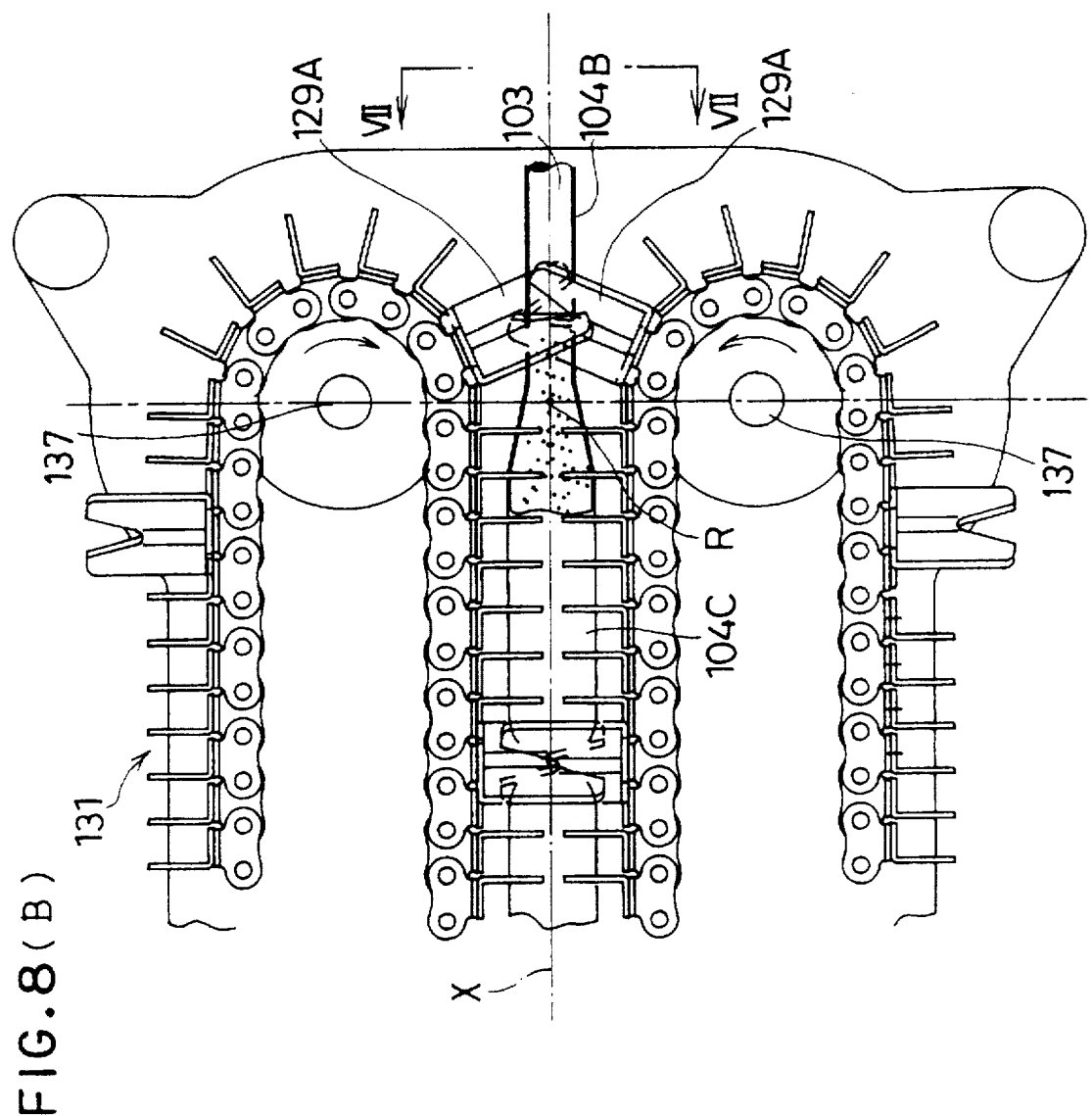
FIG. 8A is a cross-sectional view, taken in the direction of arrows VII—VII in FIG. 8B, of the stuffing nozzle with pinchers engaged with each other, illustrating the operation of the pinchers.
FIG. 8B is a plan view illustrating the operation of the pinchers.
Figure 8:
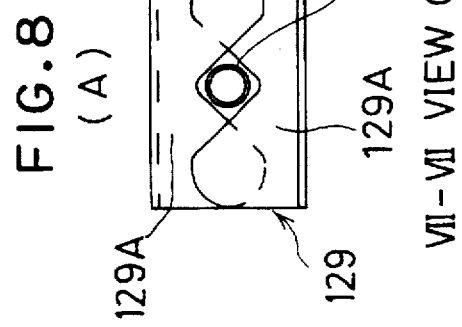

FIGS. 5 to 8B are diagrams illustrating a method and an apparatus for manufacturing chain-like food products such as sausages or the like using a natural intestine in accordance with an embodiment of the present invention. Incidentally, FIG. 5 is a schematic front elevational view of a manufacturing apparatus in accordance with the present invention; FIG. 6 is a plan view thereof; and FIGS. 7, 8A, and 8B are enlarged partially cutaway views illustrating the operation for forming a twisted portion in the stuffed natural intestine.

In the drawings, reference numeral 101 denotes a stuffing pump for supplying under pressure a stuffing material such as an emulsion-type sausage material or the like; 102 denotes a stuffing block for accommodating the stuffing material supplied, respectively from the stuffing pump 101; and 103 denotes a stuffing nozzle with a round pipe shape for stuffing a natural intestine 104, which will be described later, with the stuffing material supplied, respectively from the stuffing pump 101. The stuffing nozzle 103 has a hole 103a formed therein, and when the hole 103a is located in the stuffing block 102, the stuffing material is fed into the stuffing nozzle 103 through the hole 103a. The natural intestine 104, which is a sheep's gut or a hog's gut, is fitted over the stuffing nozzle 103.

The supply amount of the stuffing pump 101 is made variable. The stuffing-pump driving mechanism for driving the stuffing pump will be described below.

The rotation of a motor 105 for the stuffing pump is transmitted to a speed reducing gear 107 via a speed change gear 106. The speed change gear 106, which serves as a speed change means for changing the pump speed, is constituted by a speed change pulley 106A, a belt 106B, and a speed change pulley 106C. For this reason, the rotation of the motor 105 for the stuffing pump is transmitted to the speed change pulley 106C via the speed change pulley 106A and the belt 106B, and the rotation of the speed change pulley 106C is inputted to the speed reducing gear 107. An electromagnetic clutch 106D engages or disengages the transmission of rotation between the speed change pulley 106C and the speed reducing gear 107. Hence, the supply amount of the pump can be set as desired.

The output rotation of the speed reducing gear 107 is coupled to an unillustrated rotating shaft of the stuffing pump 101 via a coupling 108. Instead of using the above-described belt transmission mechanism whose speed ratio is unchangeable, it is possible to use a variable speed motor in place of the motor 105. Alternatively, an output shaft of a variable speed motor or a variable speed motor with a reducing gear may be directly coupled to the rotating shaft of the stuffing pump 101. By the term "variable speed motor" is meant, for example, a servo motor or an inverter-controlled motor.

The stuffing nozzle 103 is rotatable, and its rotating mechanism serving as a nozzle rotating means will be described below.

A motor 109 for rotating the stuffing nozzle is variable speed motor, and is capable of setting the number of revolutions of the stuffing nozzle 103 as desired. A belt 111 is wound around a pulley 110 of the motor 109, and the belt 111 is also wound around a pulley 112 for rotating the stuffing nozzle. The pulley 112 for rotating the stuffing nozzle is rotatably held by a housing 114 secured on a bed 113. The pulley 112 for rotating the stuffing nozzle is provided with a clutch pawl 112A. The stuffing nozzle 103 is connected to a cylinder rod 116A of an air cylinder 116 by means of a rotary joint 115, and the stuffing nozzle 103 is thereby reciprocated. The stuffing nozzle 103 is provided with a clutch pawl 103B engaging with the clutch pawl 112A. For this reason, when the stuffing nozzle 103 is moved by the air cylinder 116, the clutch pawls 112A and 103B engage each other, so that the rotation of the pulley 112 for rotating the stuffing nozzle is transmitted to the stuffing nozzle 103.

The natural intestine 104 is fitted over the stuffing nozzle 103 in a state in which the natural intestine 104 is sectioned into a shirred natural-intestine portion 104A and a straightened natural intestine portion 104B. An intestine pusher 117, which serves as a natural-intestine pushing member for pushing the shirred natural-intestine portion 104A toward the distal end of the stuffing nozzle 103, is fitted over the stuffing nozzle 103. The intestine pusher 117 is connected to an air cylinder 119 by means of a rod 118, and is moved by the air cylinder 119. In addition, the stuffing nozzle 103 is provided with a stepped portion 103C against which the intestine pusher 117 abuts, so as to move the intestine pusher 117 in conjunction with the movement of the stuffing nozzle 103. For this reason, the intestine pusher 117 is moved by the movement of the stuffing nozzle 103, and the position of the intestine pusher 117 when the forward advancement of the stuffing nozzle 103 is completed is an initial position IP shown in FIG. 5. The intestine pusher 117 is rotatably fitted over the stuffing nozzle 103, and a pushing member 118a secured to the rod 118 is fitted in an outer peripheral groove of the intestine pusher 117, thereby imparting the reciprocating motion of the rod 118 to the intestine pusher 117.

A detecting means 120 for detecting a trailing end of the intestine is provided on the bed 113. The detecting means 120 is constituted by a photoelectric sensor 120A which confirms the presence of the natural intestine 104 when light is shielded by the shirred natural-intestine portion 104A of the natural intestine 104 fitted over the stuffing nozzle 103, and detects the absence of the shirred natural-intestine portion 104A and the presence of the straightened natural intestine portion 104B when the light passes. The detecting means 120 has a stopper portion 120B, and as the stopper portion 120B and the pushing member 118a come into contact with each other, the movement of the intestine pusher 117 is stopped.

A housing 121 is further provided on the bed 113, and a braking member 122 serving as an engaging member is provided in the housing 121 in such a manner as to be rotatable by means of a pulley 123.

Referring to FIG. 7, a more detailed description will be given of this arrangement. The pulley 123 is held in the housing 121 in such a manner as to be rotatable by means of a bearing 124. The braking member 122 is provided in a central hole of the pulley 123. The braking member 122 is secured by a braking-member holder 125. The braking member 122 is formed of an annular member made of a synthetic rubber, and has an round opening through which the stuffing nozzle 103 is passed. The diameter of the opening is set to be identical to or smaller than the diameter of the stuffing nozzle 103.

The braking-member holder 125 partially accommodates the shirred natural-intestine portion 104A fitted over the stuffing nozzle 103, and serves as a shirred natural-intestine rotating member for rotatively driving the shirred natural-intestine portion 104A by coming into contact with the outer periphery of the shirred natural-intestine portion 104A.

A rotatively driving mechanism for rotating the braking member 122 serving as an engaging member about the axis X will be described below. A belt 126 is wound around the pulley 123, and the belt 126 is also wound around a pulley 128 of a motor 127 for the braking member. The motor 127 for the braking member is a variable speed motor, and is capable of setting the number of revolutions of the braking member 122 as desired.

In addition, a pinching device 131, which is comprised of pinchers 129 consisting of pairs of pincher members 129A and a moving means 130 for moving the same, is provided on the bed 113.

Referring also to FIG. 6, the moving means 130 consists of two pairs of rotating shafts 137, two sprockets 132 and two idle sprockets 132A attached to the respective rotating shafts 137, a pair of endless chains 133 each trained between the sprocket 132 and the idle sprocket 132A, and a multiplicity of lugs 134 attached to the respective chains 133.

The plurality of pincher members 129A are attached to the respective chains 133, and the stuffed natural intestine is pinched by the two pincher members 129A which come to oppose each other while moving together with the chains 133. A pinching-device driving mechanism consists of a motor 131A for pinching, a speed change gear 135, and a speed reducing gear 136.

The sprocket 132 is rotated by the motor 131A for pinching via the speed change gear 135, the speed reducing gear 136, and the rotating shaft 137. The moving speed of the pinchers 129 can be set as desired. The aforementioned driving mechanism can be substituted by a variable speed motor. A variable speed motor or a variable speed motor with a speed reducing gear may be used by directly coupling an output shaft of such a variable speed motor to the rotating shaft 137.

Each pincher member 129A has a V-shaped notched portion, and the stuffed natural intestine is pinched by the V-shaped notched portions of the two pincher members 129A which come to oppose each other.

Referring mainly to FIGS. 7, 8A, and 8B, a description will be given hereafter of the operation of the above-described apparatus for manufacturing chain-like food products such as sausages or the like in accordance with one embodiment of the present invention.

First, the natural intestine 104 is fitted over the stuffing nozzle 103. In this case, the natural intestine 104 is fitted in a state in which it is sectioned into the shirred natural-intestine portion 104A and the straightened natural intestine portion 104B, as shown in FIG. 5.

Then, the air cylinder 116 is actuated to allow the stuffing nozzle 103 and the straightened natural intestine portion 104B to be passed through the opening in the braking member 122. At this time, the intestine pusher 117 is pushed by the stepped portion 103C of the stuffing nozzle 103 and is moved up to the initial position IP. The interior of the air cylinder 119 communicates with the atmospheric air so that the rod 118 can be moved together with the intestine pusher 117.

Next, the stuffing pump 101 and the pinching device 131 start operation, allowing the stuffing material to be discharged from the distal end of the stuffing nozzle 103. Then, the straightened natural intestine portion 104B is pulled out from the stuffing nozzle 103, and the stuffing material is charged into the straightened natural intestine portion 104B, thereby forming a stuffed natural intestine 104C. This stuffed natural intestine 104C is first pinched and pulled by the lugs 134 of the pinching device 131 which moves in the direction of arrow. Then, the stuffed natural intestine 104C is pinched by the pinchers 129.

When the stuffed natural intestine 104C pulls the straightened natural intestine portion 104B, the straightened natural intestine portion 104B moves while slipping and being braked by the stuffing nozzle 103. Also, since the straightened natural intestine portion 104B is also engaged with the opening portion of the braking member 122, the straightened natural intestine portion 104B receives a further braking force from the braking member 122. Since the straightened natural intestine portion 104B is stretched particularly between the pinchers 129 and the braking member 122, the straightened natural intestine portion 104B fitted over the stuffing nozzle 103 is subjected to be reduced in diameter thereof more strongly, and the straightened natural intestine portion 104B is brought into contact with or close contacts to the outer periphery of the stuffing nozzle 103. For this reason, the rotation of the stuffing nozzle 103 is transmitted to the stuffed natural intestine 104C by means of the straightened natural intestine portion 104B whose diameter is reduced, and the stuffed natural intestine 104C is consequently rotated by the rotation of the stuffing nozzle 103. Hence, a twist is produced in the portion of the stuffed natural intestine 104C pinched by the pinchers 129, thereby forming a linked portion.

In accordance with the present invention, it suffices if the straightened natural intestine portion on the stuffing nozzle in the state of a reduced diameter rotates together with the stuffing nozzle. In the apparatus of this embodiment in which the braking member serving as the engaging member is rotated by the rotatively driving mechanism, even if the braking member 122 substantially imparts a rotating force to the outer periphery of the straightened natural intestine portion 104B, such a case does not depart from the scope of the present invention.

Figure 9:
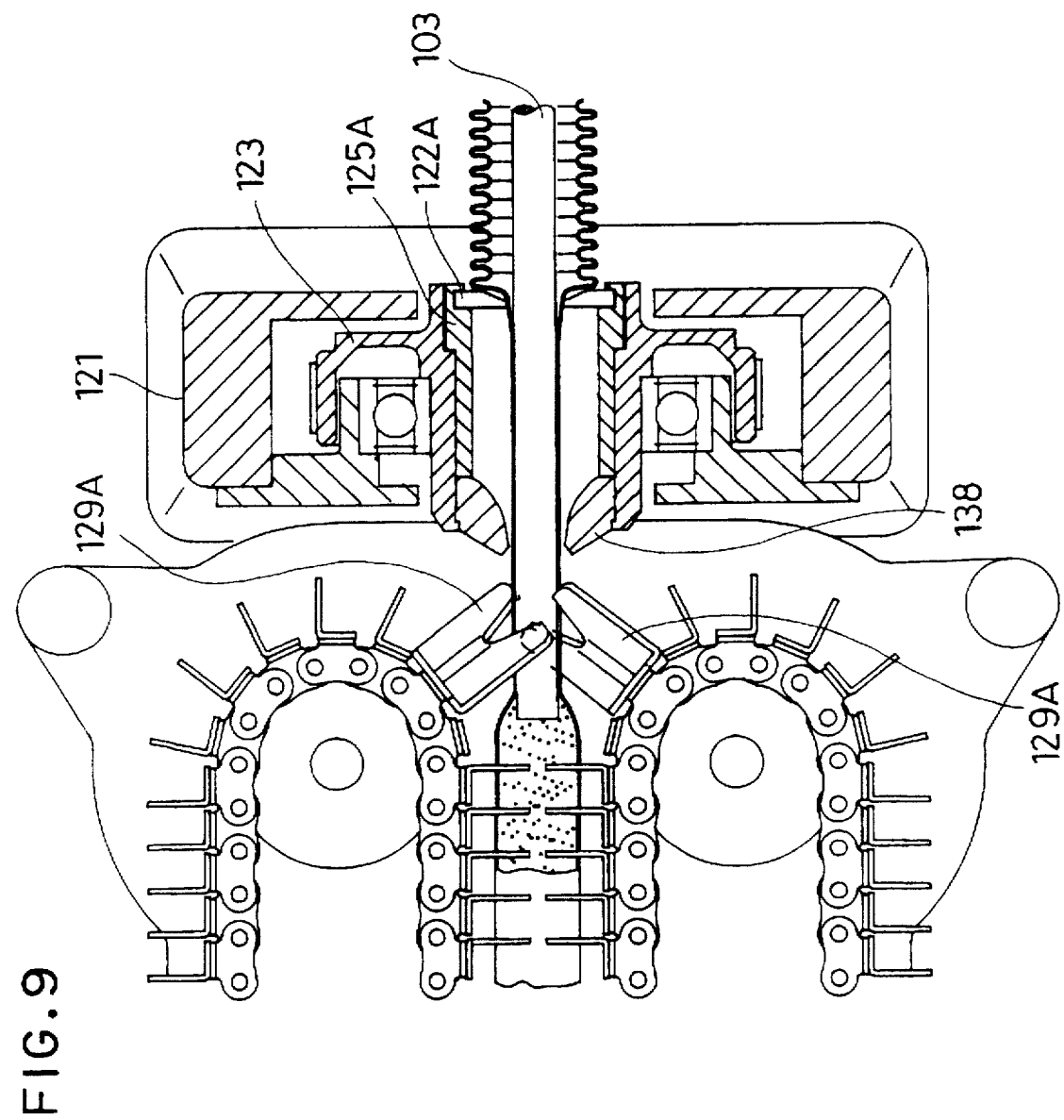
FIG. 9 is a cross-sectional plan view illustrating still another embodiment of the present invention in which the run out of a distal end of the stuffing nozzle is prevented.

To further reduce the diameter of the natural intestine, the engaging member engaging with the natural intestine fitted over the stuffing nozzle is capable of assuming various forms. For example, it is possible to cite a form in which, as shown in this embodiment, the engaging member abuts against the outer periphery of the straightened natural intestine portion 104B, and a form in which, as shown in FIG. 9 which will be referred to later, the engaging member has a hole diameter larger than the outside diameter of the stuffing nozzle 103, and comes into contact mainly with the shirred natural-intestine portion 104A.

A more detailed description will be given of the path of operation of the above-described pinchers 129.

As shown in FIG. 7, the pincher members 129A of the pinchers 129 move from a rearward region P toward a forward region Q located relative to a reference line passing through the distal end (discharging end) of the stuffing nozzle 103. Then, the pincher members 129A engage each other at an engaging position R located forwardly of the distal end of the stuffing nozzle 103. Here, the closer to the distal end of the stuffing nozzle 103 the engaging position R is, the more preferable. Namely, the closer to the distal end of the stuffing nozzle 103 the engaging position R is, the more reliably a twist can be produced in the stuffed natural intestine 104C.

To describe this aspect with reference to FIGS. 8A and 8B, when the path of rotation of the troughs of the V-shaped grooves of the pincher members 129A is such that the troughs of the V-shaped grooves are substantially brought into contact with the outer periphery of the distal end of the stuffing nozzle 103, the engaging position R of the pinchers 129 is close to the distal end of the stuffing nozzle 103. In such a state, if the pinchers 129 pinch the stuffed natural intestine 104C, the twisting position of the stuffed natural intestine 104C can be reliably specified to the pinched portion, and the breakage of the stuffed natural intestine 104C is prevented.

When the shirred natural intestine portion 104A of the natural intestine 104 over the suffing nozzle 103 ceases to be present, the photoelectric sensor 120A of the detecting means 120 is operated to stop the operation of the stuffing pump 101. Then, the air cylinder 116 is retracted to move the stuffing nozzle 103 rightwardly in FIG. 5, and at the same time the air cylinder 119 is also retracted to move the intestine pusher 117, thereby completing the stuffing operation. Although a transmission type is used as the photoelectric sensor 120A, but the type of sensor is not restricted.

Next, a description will be given of the operation of the intestine pusher 117. When the natural intestine 104 over the stuffing nozzle 103 is consecutively pulled out, the length of the straightened natural intestine portion 104B becomes long. To reduce this length, the air cylinder 119 is actuated to move the pushing member 118a of the rod 118 abuts against the stopper 120B. As a result of this movement, the intestine pusher 117 which was stopped at the initial position IP moves to a predetermined position, and pushes the trailing end of the shirred natural intestine portion 104A in steps. The intestine pusher 117 is stopped at the aforementioned predetermined position until all the stuffing operation is completed. The predetermined position may be advanced from the initial position IP in a multiplicity of steps.

In this embodiment, the stuffing nozzle 103 and the intestine pusher 117 are operated by air cylinders, but these members may be operated manually instead. Namely, an arrangement may be provided such that the interiors of the air cylinders 116 and 119 are made to communicate with the atmospheric air, a handle is secured to the rod 116A of the air cylinder 116, and another handle is secured to the rod 118 as well. By pushing these handles in the leftward and rightward directions in FIG. 5, the stuffing nozzle 103 and the intestine pusher 117 can be operated manually.

The installed position of the photoelectric sensor 120A of the detecting means may be changed to a position which permits the photoelectric sensor 120A to detect the pushing member 118a which is stopped by the stopper 120B, and the photoelectric sensor 120A may be operated to detect the pushing member 118a at that position. In the method in which the intestine pusher 117 is operated manually, it is effective to stop the stuffing pump 101 by this detecting method.

Although during the above-described stuffing operation, the braking member 122 is rotated by the motor 127 for the braking member, the braking member 122 may not necessarily be forcibly rotated. For example, a structure may be provided such that the braking member 122 is rotatably held, and the braking member 122 is rotated by the rotation of the stuffing nozzle 103.

In the embodiments illustrated in FIGS. 1 through 8B, there are cases where if the stuffing nozzle is bent or its rigidity is low, the stuffing nozzle may move in a swaying manner up and down or left and right, possibly coming into contact with the pinchers. Accordingly, it is possible to adopt a structure in which, as shown in FIG. 9, a member for preventing the running out of the stuffing nozzle 103 is provided to prevent contact with the pincher members 129A.

That is, a run-out preventing member 138 is fixed by a run-out preventing member holder 125A having a braking member 122 so as to rotate integrally with the pulley 123. The inside diameter of the run-out preventing member 138 is set to be larger than the outside diameter of the stuffing nozzle 103. Even if the run out occurs in the stuffing nozzle 103, the amount of run out is restricted by a hole portion of the run-out preventing member 138, thereby preventing the stuffing nozzle 103 from contacting the pincer members 129A. Although the material of the run-out preventing member 138 is selected appropriately, a synthetic resin which is unlikely to be deformed is preferable. It is not necessary to dispose the run-out preventing member 138 if a material which is unlikely to be deformed is used for the braking member. The braking member 122A strokes the natural intestine C to undo subtle overlapping of the straightened natural intestine portion 104B in the process that the shirred natural intestine portion 104A is stretched by the straightened natural intestine portion 104B which moves by being pulled by the stuffed natural intestine 104C.

Although in the embodiment shown in FIGS. 5 to 8B, the stuffing nozzle is reciprocated, the present invention is not limited to the above-described embodiment, and it is possible to adopt a structure in which the stuffing nozzle is fixed, and the pinching device is moved, as will be described below.

Referring to FIGS. 10 to 12E, a stuffing nozzle 61 is rotatable, but it does not reciprocate. A natural intestine 66 is fitted over the stuffing nozzle 61 in a state in which the natural intestine 66 is sectioned into a shirred natural-intestine portion 66A and a straightened natural intestine portion 66B. A stuffing material is automatically fed into the stuffing nozzle 61 from a stuffing pump 62. Further, as for a nozzle rotating means for rotating the stuffing nozzle 61, a transmission gear 64 attached to a variable speed motor 63 for rotating the stuffing nozzle is engaged with a driving member 65 with a transmission gear, whereby the stuffing nozzle 61 attached to the driving member 65 with a transmission gear is rotated. An output shaft of a variable speed motor 62B for the stuffing pump is connected to a pump shaft 62A of the stuffing pump 62. The stuffing nozzle 62 is operated at a desired speed by the driving mechanism having the variable speed motor 62B.

Furthermore, although in the embodiment shown in FIGS. 5 to 8B, the intestine pusher is automatically moved by the air cylinder, in this embodiment an intestine pushing collar 67 serving as a natural-intestine pushing member is manually pushed toward the distal end of the stuffing nozzle 61 by the operator so as to push the natural intestine 66 fitted over the stuffing nozzle 61. A stopper 68 is provided to stop the movement of the intestine pushing collar 67, and the stopper 68 constitutes a detecting means 69 together with a photoelectric sensor 69A for detecting the trailing end of the natural intestine 66 fitted over the stuffing nozzle 61. The variable speed motor 62B for the stuffing pump for driving the stuffing pump 62 is stopped by a signal from the detecting means 69. The operation of the detecting means 69 is substantially similar to that in the foregoing embodiment.

A pinching device is provided in proximity to the distal end of the stuffing nozzle 61, and a conveying device 71 is provided on the downstream side thereof for continuously conveying at a predetermined speed a stuffed natural intestine 66C stuffed with the stuffing material by nipping the stuffed natural intestine 66C. These devices are mounted on a mounting member 72. The mounting member 72 is attached to a housing 74 in which the stuffing nozzle 61 is attached, in such a manner as to be rotatable in the direction of double-headed arrow P by means of a pin 73.

The pinching device 70 in this embodiment is structured such that a pair of pincher members 70C each having a U-groove 70E are respectively attached to two rotating members 70A arranged vertically in face-to-face relationship. A pinched portion is formed in the stuffed natural intestine 66C by means of the U-grooves 70E of the two pincher members 70C. A pinching-device driving mechanism for driving the pinching device 70 is provided on the mounting member 72. The pinching-device driving mechanism has a motor 75 for the pinchers and a pair of gears 76. One rotating member 70A of the pinching device 70 is attached to a rotating shaft 70D connected to a shaft of the motor 75 for the pinchers, and is rotated at a desired number of revolutions by the motor 75. The gears 76 are used to rotate the other opposing rotating member 70A. The aforementioned rotating members 70A and the rotating shafts 70D constitute a moving means for moving the pinchers. The rotating members 70A may be omitted, and the pincher members 70C may be attached directly to the rotating shafts 70D, respectively.

To ensure that the pincher members 70C move from the rearward region P located rearwardly of the distal end 61A of the stuffing nozzle 61 toward the forward region Q located forwardly thereof, the rotating shafts 70D of the pincher members 70C, which serve as the centers of movement, are disposed at positions symmetrical about the axis X of the stuffing nozzle 61. The pair of pincher members 70C constituting pinchers 70B rotate together with the rotating shafts 70D, and after pinching the stuffed natural intestine 66C which is conveyed by the conveying device 71, the pair of pincher members 70C immediately cancel pinching. The fact that the engaging position R of the pincher members 70C is located in proximity to the distal end 61A of the stuffing nozzle 61, as well as the operation of the arrangement, are substantially similar to those of the other embodiments described above.

The nozzle rotating means rotates the stuffing nozzle 61 in such a manner as to impart a twist to the position in the stuffed natural intestine 66C pinched by the pinchers 70B. The variable speed motor 63 intermittently rotates the stuffing nozzle 61 such that the pinchers 70B completes the formation of the twist while pinching the stuffed natural intestine 66C. The stuffing nozzle 61 may be rotated continuously.

In this embodiment, the length of the sausage can be varied as desired.

If the period of pinching by the pinchers 70B is set, as desired, with respect to the stuffed natural intestine 66C which is conveyed by the conveying device 71, it is possible to obtain a desired interval of twisting of the stuffed natural intestine (i.e., the length of the sausage).

The speed of revolutions of the pincher members 70C can be set, as desired, by the motor 75 for the pinchers, which is a variable speed motor, while the conveying speed of the conveying device 71 can be set, as desired, by a motor 77 for the conveying device, which is a variable speed motor, for driving the conveying device 71.

In terms of the rotation of the pincher members 70C, the pincher members 70C may be operated at either constant speed or nonconstant speed. In the case of the constant speed, a difference in speed occurs between the speed of the pincher members 70C and the speed of the stuffed natural intestine 66C being conveyed at the time when the stuffed natural intestine 66C is being pinched by the pincher members 70C. However, in this embodiment in which the stuffed natural intestine 66C is pinched at the position located in proximity to the distal end of the stuffing nozzle, it is possible to impart a twist reliably even if there is a difference in speed.

In the case of the nonconstant speed, the speed of the pincher members 70C being pinching the stuffed natural intestine 66C can be set at a speed substantially equivalent to the speed of the stuffed natural intestine 66C being conveyed. The motor 75 is controlled by an appropriate controller so as to effect nonconstant speed rotation. The term "nonconstant speed rotation" of the pincher members 70C which is referred to herein includes intermittent rotation.

Incidentally, although the number of pinchers 70C attached to one rotating member 70A may be one as illustrated in the drawings, the number of pinchers 70C attached to one rotating member 70A may be set to two or more.

The conveying device 71 is arranged such that a pair of upper and lower endless chains 71A arranged in face-to-face relation are rotated endlessly by sprockets 71B, respectively, and the stuffed natural intestine 66C is nipped by lugs 71C provided on the chains 71A so as to continuously convey the stuffed natural intestine 66C. Incidentally, a description has already been given of the operation in which the stuffed natural intestine 66C is conveyed, and the natural intestine 66 is made to undergo a reduction in diameter so as to be brought into contact, preferably close contact, with the stuffing nozzle 61 by pulling and moving the straightened natural intestine portion 66B of the natural intestine 66 fitted over the stuffing nozzle 61. Therefore, a detailed description thereof will be omitted here.

To nip the stuffed natural intestine 66C by means of the lugs 71C, it is necessary to prevent slippage as much as possible. Therefore, structures such as those shown in FIGS. 12A to 12E are adopted.

First, in FIGS. 12A, 12C, and 12D, the lugs 71C which are arranged in face-to-face relation are disposed at positions offset from each other. According to this structure, since the lugs 71 on both chains do not collide against each other, it is possible to nip the stuffed natural intestine 66C firmly.

Meanwhile, in FIGS. 12B and 12E, the lugs 71C which are arranged in face-to-face relation are disposed at the same positions. According to this structure as well, it is possible to prevent the slippage of the stuffed natural intestine 66C.

The prevention of the slippage of the stuffed natural intestine 66C in the above-described manner means that the length of the conveying device 71 can be shortened by that margin. Consequently, the mounting member 72 can be made compact, and the opening/closing operation of the mounting member 72 can be effected speedily.

In the apparatus of this embodiment, it is possible to further provide an engaging member through which the stuffing nozzle 61 is inserted, and which engages the natural intestine 66 which is fitted over the stuffing nozzle 61. Further, it is also possible to further provide the rotatively driving mechanism for rotating the engaging member about the axis X of the stuffing nozzle 61. This rotatively driving mechanism may be further provided with a motor for rotating the engaging member. This motor may be a variable speed motor.

Furthermore, an arrangement may be provided such that the intestine pushing collar 67 serving as the natural-intestine pushing member is moved in steps by a known actuator.

In the present invention, it is possible to adopt an embodiment such as the one shown in FIGS. 13A and 13B. This embodiment is similar to the embodiment shown in FIGS. 10 and 11 in that sausages of a desired length can be obtained. However, this embodiment differs from the same in the construction of the pinching device, as will be described below.

A pinching device 81 is comprised of two pairs of pincher members 83A and 83B, one pair of which is provided at an equal interval on each of a pair of endless chains 82, as well as a moving means 85 including rotating shafts 80 for moving the pincher members 83A and 83B, the pair of chains 82, and sprockets 84. The two pincher members 83A, which engage each other by opposing each other from upper and lower positions, move linearly in the forward direction of a stuffing nozzle 86, and subsequently cancel their engagement. The two pincher members 83A and the two pincher members 83B, which are respectively provided at symmetrical position about the axis X of the stuffing nozzle 86, constitute pinchers 83. A conveying device 87 consists of two flat endless belts 87A which oppose each other. Reference numeral 87C denotes a variable speed motor for driving the conveying device 87.

As shown in FIG. 13B, the stuffing nozzle 86 is a pipe having a square cross section, and a braking member 88 has a round through hole and abuts against the four corners of the stuffing nozzle 86. The braking member 88 rotates inside a bracket 91 together with the stuffing nozzle 86 due to the rotation of the stuffing nozzle 86. The braking member 88 is engaged with the natural intestine 89 to reliably stretch the bellows shaped state of the shirred natural intestine portion 89B to be the straightened natural intestine 89B.

Figure 10:
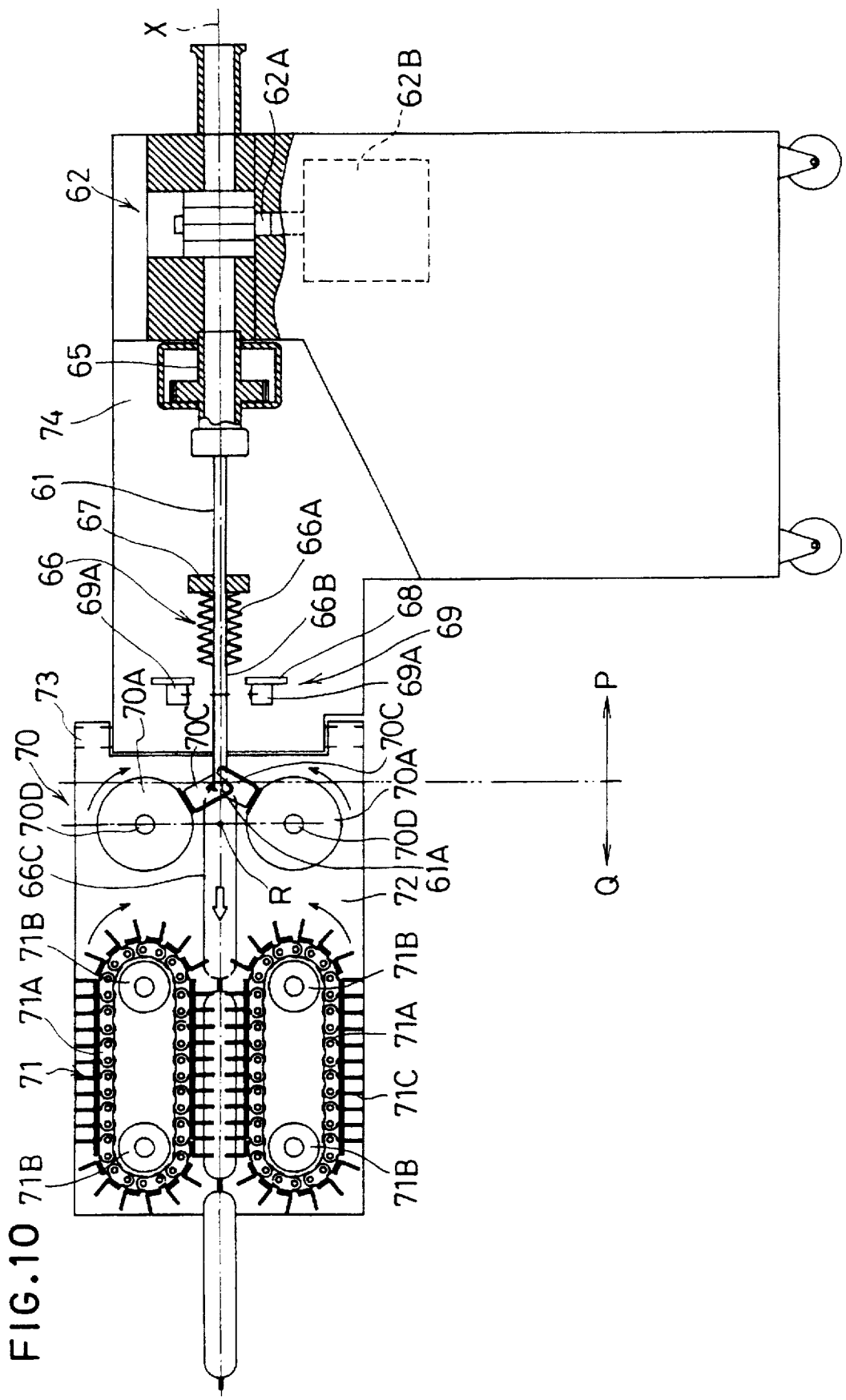
FIG. 10 is a partly cutaway front elevational view illustrating a further embodiment of the present invention.
Figure 11:
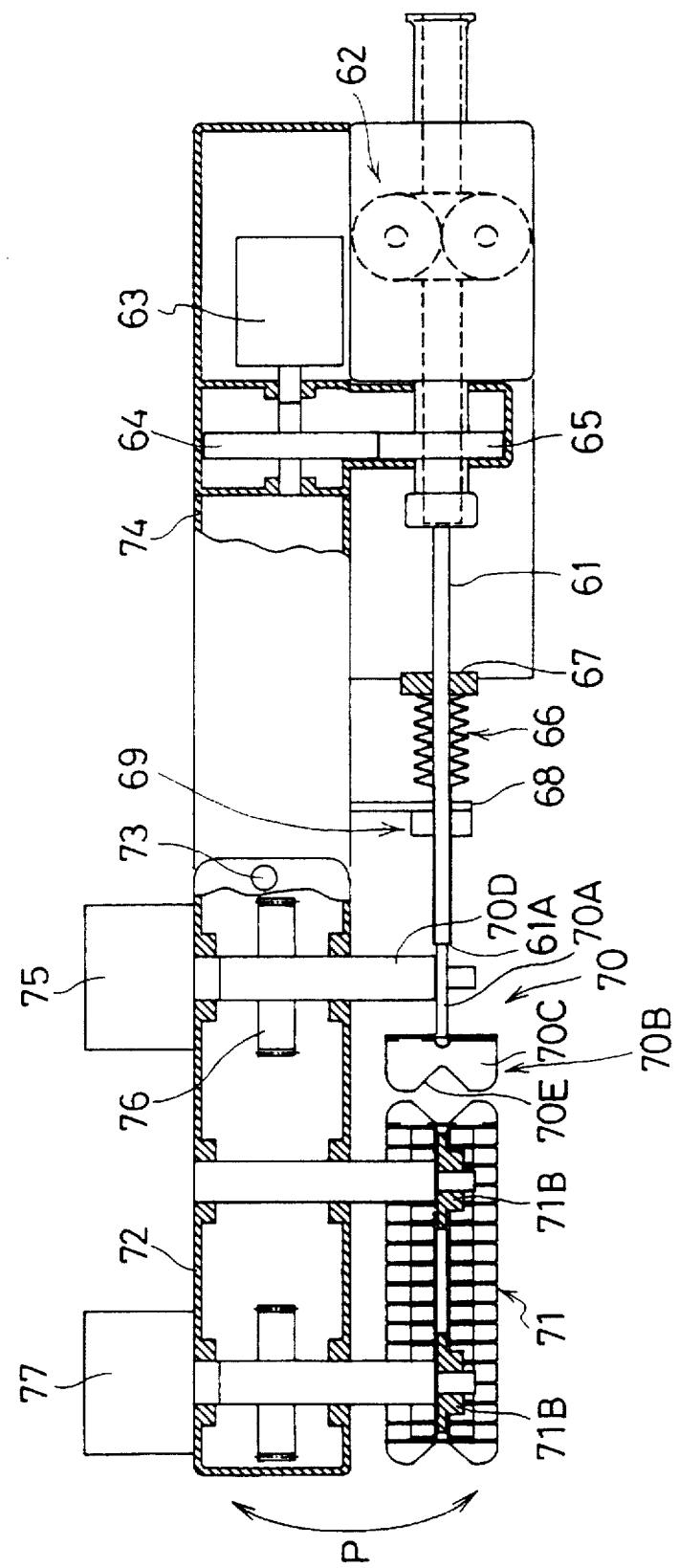
FIG. 11 is a partly cutaway plan view of FIG. 10.

This embodiment is similar to the embodiment shown in FIGS. 10 and 11 in that a desired twisting interval is obtained by setting the period of pinching by the pincher members 83A and 83B, as desired. In addition, since the pincher members 83A and 83B pinching a stuffed natural intestine 89 have a linearly moving distance, it is desirable to set the moving speed of the flat belts 87A of the conveying device 87 and the linearly moving speed of the pincher members 83A and 83B to the same speed. A variable speed motor 90 for pinchers controls the pinching device 81 such that the two pairs of pincher members 83A and 83B alternately pinch the stuffed natural intestine 89 at a desired period, respectively, and the pinching pincher members 83A and 83B move at the same speed as the moving speed of the flat belts 87A. The variable motor 90 for pinchers constitutes a pinching-device driving mechanism.

It should be noted that, in the embodiment shown in FIGS. 13A and 13B, the pinching device 81 may be provided with the pair of chains 82 having only one pair of pincher members 83A. Here, the chains 82 and the sprockets 84 may be replaced by known endless members, such as timing belts and timing pulleys. According to these embodiments, since the pinchers 83 are provided with a linearly moving region, the pinching time becomes long, and the twisting can be provided more reliably.

Figure 14:
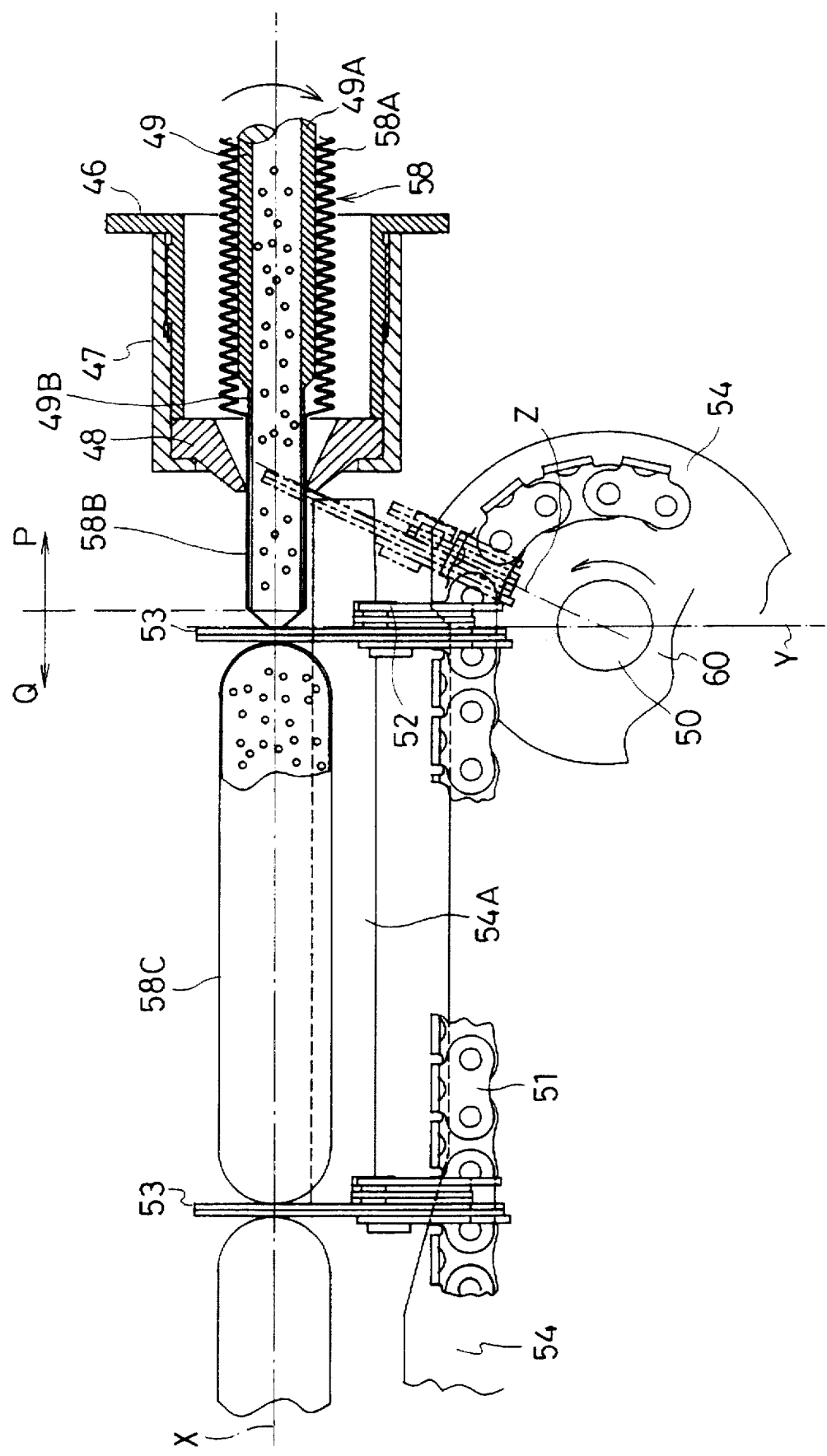
FIG. 14 is a partly cutaway plan view illustrating a still further embodiment of the present invention.

The pinchers shown in the foregoing embodiments are of the type in which the stuffed natural intestine is pinched as a pair of opposing pincher members mesh with each other. However, in the present invention, it is possible to adopt opening/closing type pinchers such as those shown in FIGS. 14 and 15.

Pinchers 53 are each provided with a pair of pincher members 53A and 53B which can be opened and closed and are provided laterally of the axis X of a stuffing nozzle 49.

The pinchers 53 are mounted on a moving means which is comprised of a pair of rotating shafts 50, two pairs of sprockets 60, a pair of endless chains 51, and brackets 52.

More specifically, brackets are attached to the pair of chains 51 which rotate endlessly by meshing with the two pairs of sprockets 60 which are provided on the two vertically disposed rotating shafts 50 by being vertically spaced away from each other. The pinchers 53 are respectively attached to the brackets 52 in such a manner as to be capable of opening and closing.

The pincher 53 is opened and closed by a cam 54 and a cam 54A, respectively, and the opening and closing mechanism operates as described below.

A cam follower 55 is provided adjacent to the cam 54. The cam follower 55 is provided at an end of a swing lever 56. The lever 56 is rotated about a fulcrum 57. The pincher 53 is constituted by two pincher members 53A and 53B, and the pincher members 53A and 53B pinch a stuffed natural intestine 58C by intersecting each other like a pair of scissors.

The pincher members 53A and 53B are respectively connected to links 56A and 56B which are connected to an upper end of the lever 56. Each connection is provided by a pin.

The open state of the pincher members 53A and 53B is realized by the cam 54, while the closed state thereof is realized by the cam 54A. The position of completion of the closing of the pincher members 53A and 53B is immediately close to an axis Y passing through the rotating shaft 50, which is the center of movement of the pinchers. The distal end (the discharge end) of a stuffing nozzle 49 is at a position located in proximity to the axis Y.

In this embodiment, a braking member 48 serving as the engaging member is accommodated in a bracket 47, and a holding member 46 fixes the braking member 48 with respect to the axial direction. The diameter of the hole of the braking member 48 is set to be the same as or smaller than the outside diameter of the stuffing nozzle 49, and the braking member 48 is rotated in the bracket 47 together with the stuffing nozzle 49 due to the rotation of the stuffing nozzle 49.

A description will be given of the operation. The swing lever 56 is swung by the cam follower 55 which moves by following the cam 54 and the cam 54A. The pincher members 53A and 53B are rotated about a fulcrum 59 by the swinging lever 56. As a result, the pincher members 53A and 53B pinch the stuffed natural intestine 58C. When the pincher 53 which is set in the open position by the cam 54 reaches a Z position, the closing operation by the cam 54A is started at this point of time, and the pincher 53 is fully closed virtually on the axis Y.

Reference numeral 49 denotes the stuffing nozzle having the shape of a round pipe and provided with a large-diameter portion 49A and a small-diameter portion 49B. A shirred natural intestine portion 58A of the natural intestine 58 is fitted over the large-diameter portion 49A, while a straightened natural intestine portion 58B is fitted over the small-diameter portion 49B. According to this stuffing nozzle 49, since the gap with the shirred natural intestine portion 58A is small, the rotation of the stuffing nozzle 49 is liable to be imparted to the shirred natural intestine portion.

Since the other structures are substantially similar to those of the foregoing embodiments, a description thereof will be omitted.

The method using the opening/closing pinchers 53 of this cam type make it possible to pinch the stuffed natural intestine 58C immediately in front of the distal end of the stuffing nozzle, and minimize the moving distance of the pincher up to the completion of pinching. In addition, this method makes it possible to eliminate variations in the position of the linked portion, and improve the quality of sausage products.

In the present invention, the operation of the stuffing pump, the stuffing nozzle, the pinchers, and the conveying device is not confined to those of the above-described embodiments. For example, it is possible to adopt a form which will be described below.

In the apparatus of the embodiments shown in FIGS. 1 to 9 and FIGS. 14 and 15, the stuffing pump may be intermittently driven with respect to the continuously moving pinchers to intermittently discharge the stuffing material. Alternatively, the intermittent driving of the stuffing pump may be synchronized with the intermittently moving pinchers to intermittently discharge the stuffing material. As for the rotating state of the stuffing nozzle, it is possible to adopt either the continuously rotating state or the intermittently rotating state.

In the apparatus of the embodiments shown in FIGS. 11 to 13B, the stuffing pump may be intermittently driven with respect to the continuously moving conveying device to intermittently discharge the stuffing material. Alternatively, the intermittent driving of the stuffing pump may be synchronized with the intermittently moving conveying device to intermittently discharge the stuffing material. The rotating state of the stuffing nozzle is not restricted, as described above.

In the present invention, it is possible to adopt various variable speed motors (including variable motors with speed reducing gears) as the motor for driving the stuffing pump, the motor for rotating the stuffing nozzle, the motor for rotating the engaging member (braking member), the motor for driving the pinching device, and the motor for driving the conveying device. These variable speed motors are, for example, servo motors or inverter-controlled motors, and are provided known speed changing means for changing the number of revolutions of the motors.

What is claimed is:

1. A method for manufacturing chain-like food products such as sausages or the like, comprising the steps of:
   pinching a stuffed natural intestine;
   conveying the stuffed natural intestine by applying a conveying force directly to an outer peripheral surface of the stuffed natural intestine so as to reduce a diameter of an inner peripheral surface of an unstuffed natural intestine by pulling and moving the unstuffed natural intestine following the stuffed natural intestine based on said conveying force; and
   discharging a stuffing material into the unstuffed natural intestine with the diameter thereof reduced which moves by being pulled by the stuffed natural intestine based on said conveying force, to form the stuffed natural intestine, holding in a cylindrical shape the inner peripheral surface of the unstuffed natural intestine with the diameter thereof reduced, imparting a rotational force to the inner peripheral surface of the unstuffed natural intestine held in the cylindrical shape so as to rotate the stuffed natural intestine preceding the unstuffed natural intestine via the unstuffed natural intestine with the diameter thereof reduced, and forming a twist at a pinched position of the stuffed natural intestine.

2. An apparatus for manufacturing chain-like food products such as sausages or the like, comprising:
   means for pinching a stuffed natural intestine and for conveying the stuffed natural intestine by applying a conveying force directly to an outer peripheral surface of the stuffed natural intestine so as to reduce a diameter of an inner peripheral surface of an unstuffed natural intestine by pulling and moving the unstuffed natural intestine following the stuffed natural intestine based on said conveying force; and
   means for discharging a stuffing material into the unstuffed natural intestine with the diameter thereof reduced which moves by being pulled by the stuffed natural intestine based on said conveying force, to form the stuffed natural intestine, for holding in a cylindrical shape the inner peripheral surface of the unstuffed natural intestine with the diameter thereof reduced, for imparting a rotational force to the inner peripheral surface of the unstuffed natural intestine held in the cylindrical shape so as to rotate the stuffed natural intestine preceding the unstuffed natural intestine via the unstuffed natural intestine with the diameter thereof reduced, and for forming a twist at a pinched position of the stuffed natural intestine.

3. A method for manufacturing chain-like food products such as sausages or the like, comprising the steps of:
   discharging a stuffing material from a distal end of a stuffing nozzle into a natural intestine to form a stuffed natural intestine forwardly of the distal end of said stuffing nozzle; and
   conveying the stuffed natural intestine forwardly of the distal end of said stuffing nozzle at a predetermined speed by applying a conveying force directly to an outer peripheral surface of the stuffed natural intestine, pinching the stuffed natural intestine in a predetermined cycle, and pulling and moving the natural intestine on the stuffing nozzle by the stuffed natural intestine conveyed at the predetermined speed based on said conveying force, to reduce a diameter of the natural intestine so as to cause the natural intestine to come into contact with an outer periphery of said stuffing nozzle, and rotating the stuffed natural intestine by a rotation of said stuffing nozzle with which the natural intestine with the diameter thereof reduced is brought into contact, so as to form a twist at a pinched position of the stuffed natural intestine,
   wherein the discharge of the stuffing material into the natural intestine is effected while the natural intestine with its diameter reduced on the stuffing nozzle is pulled out from the distal end of the stuffing nozzle by the stuffed natural intestine conveyed at the predetermined speed based on said conveying force.

4. An apparatus for manufacturing chain-like food products such as sausages or the like, comprising:
   stuffing nozzle for forming a stuffed natural intestine forwardly of a distal end of said stuffing nozzle by discharging a stuffing material from the distal end of said stuffing nozzle into a natural intestine;
   means for pinching the stuffed natural intestine;
   means for conveying the stuffed natural intestine forwardly of the distal end of said stuffing nozzle by applying a conveying force directly to an outer peripheral surface of the stuffed natural intestine to reduce a diameter of the natural intestine by pulling and moving the natural intestine on the nozzle based on said conveying force so as to cause the natural intestine to come into contact with an outer peripheral surface of said stuffing nozzle, for rotating the stuffed natural intestine by a rotation of said stuffing nozzle with which the natural intestine with its diameter reduced is brought into contact, so as to form a twist in a pinched position of the stuffed natural intestine; and means for supplying the stuffing material with the stuffing nozzle so as to discharge the stuffing material into the natural intestine with its diameter reduced on the stuffing nozzle, the natural intestine with its diameter reduced being pulled out from the stuffing nozzle by the conveyed stuffed natural intestine based on said conveying force.

5. An apparatus for manufacturing chain-like food products such as sausages or the like, comprising:

a rotatable stuffing nozzle over which a natural intestine is fitted, said stuffing nozzle being capable of continuously discharging a stuffed material into an interior of the natural intestine;

a pinching device having a pincher comprised of a pair of pincher members for consecutively pinching a stuffed natural intestine stuffed with the stuffing material and moving means having a wrapping connector means for moving the pincher members continuously and applying a conveying force to an outer peripheral surface of the stuffed natural intestine through the pincher members so as to reduce a diameter of the natural intestine fitted over said stuffing nozzle as the stuffed natural intestine is conveyed by said pincher based on said conveying force;

nozzle rotating means for rotating said stuffing nozzle with which the natural intestine with its diameter reduced is brought into contact, so as to rotate the stuffed natural intestine and form a twist to a pinched portion of the stuffed natural intestine pinched by said pincher; and a stuffing pump for supplying the stuffing nozzle with the stuffing material so as to discharge the stuffing material into the natural intestine with its diameter reduced on the stuffing nozzle, the natural intestine with its diameter reduced being pulled out from a distal end of the stuffing nozzle by the stuffed natural intestine conveyed by the pinching device based on said conveying force.

6. An apparatus for manufacturing chain-like food products such as sausages or the like according to claim 5, wherein said pair of pincher members is disposed such that a center of movement of said pair of pincher members is located laterally of an axis of said stuffing nozzle so that said pair of pincher members moves from a rearward region located rearwardly of the distal end of said stuffing nozzle toward a forward region located forwardly thereof and pinches the stuffed natural intestine.

7. An apparatus for manufacturing chain-like food products such as sausages or the like, comprising:

a rotatable stuffing nozzle over which a natural intestine is fitted, said stuffing nozzle being capable of discharging a stuffed material into an interior of the natural intestine portion;

a conveying device comprised of a wrapping connector means for conveying at a predetermined speed a stuffed natural intestine stuffed with the stuffing material while nipping the stuffed natural intestine, for pulling the natural intestine fitted over said stuffing nozzle by the conveyance, so as to reduce a diameter of the natural intestine and cause the natural intestine with the diameter reduced to be brought into contact with an outer peripheral surface of said stuffing nozzle;

a pinching device disposed between the stuffing nozzle and the conveying device, and having a pincher comprised of a pair of pincher members for pinching the stuffed natural intestine conveyed by the conveying device in a predetermined cycle and moving means for moving said pincher;

nozzle rotating means for rotating said stuffing nozzle with which the natural intestine with its diameter reduced is brought into contact; and a stuffing pump for supplying the stuffing nozzle with the stuffing material so as to discharge the stuffing material into the natural intestine with its diameter reduced on the stuffing nozzle, the natural intestine with its diameter reduced being pulled out from a distal end of the stuffing nozzle by the stuffed natural intestine conveyed by the conveying device.

8. An apparatus for manufacturing chain-like food products such as sausages or the like according to claim 7, wherein said pair of pincher members is disposed such that a center of movement of said pair of pincher members is located laterally of an axis of said stuffing nozzle so that said pair of pincher members moves from a rearward region located rearwardly of the distal end of said stuffing nozzle toward a forward region located forwardly thereof and pinches the stuffed natural intestine.

9. An apparatus for manufacturing chain-like food products such as sausages or the like according to claim 4, 5, or 7, further comprising: an engaging member through which said stuffing nozzle is inserted and which engages the natural intestine which is fitted over said stuffing nozzle.

10. An apparatus for manufacturing chain-like food products such as sausages or the like according to claim 9, further comprising:

a rotatively driving mechanism for rotating said engaging member about an axis of said stuffing nozzle.

11. An apparatus for manufacturing chain-like food products such as sausages or the like according to claim 5 or 7, wherein said natural intestine fitted over said stuffing nozzle is sectioned into a straightened natural intestine portion and a shirred natural intestine portion, said stuffing nozzle discharging the stuffing material into the straightened intestine portion; and wherein said apparatus further comprises a natural intestine pushing and advancing member for pushing and advancing the shirred natural intestine portion fitted over said stuffing nozzle toward the distal end of said stuffing nozzle, so as to reduce a length of the straightened natural intestine portion.

12. An apparatus for manufacturing chain-like food products such as sausages or the like according to claim 11, adapted such that the pushing and advancing of the shirred natural intestine portion by said natural-intestine pushing and advancing member is effected in steps.

13. An apparatus for manufacturing chain-like food products such as sausages or the like according to any one of claims 5 to 8, wherein said pair of pincher members are provided at symmetrical positions about an axis of said stuffing nozzle, and said moving means is adapted to move each of said pincher members.

14. An apparatus for manufacturing chain-like food products such as sausages or the like according to claim 5 to 6, wherein said pair of pincher members are capable of opening and closing and are provided laterally of an axis of said stuffing nozzle, and said pair of pincher members are provided on said moving means at predetermined intervals.

15. An apparatus for manufacturing chain-like food products such as sausages or the like according to claim 5 or 7, further comprising: a stuffing-pump driving mechanism for driving said stuffing pump and having speed changing means for changing a pumping speed of said stuffing pump;

and a pinching-device driving mechanism for driving said pinching device and having speed changing means for changing a moving speed of said pincher.

16. An apparatus for manufacturing chain-like food products such as sausages or the like according to claim 5 or 7, wherein said nozzle rotating means has speed changing means for changing a nozzle rotating speed.

17. An apparatus for manufacturing chain-like food products such as sausages or the like according to claim 5 or 7, further comprising: a motor for driving said stuffing pump; and a motor for driving said pinching device, wherein said nozzle rotating means has a motor for rotating said stuffing nozzle, and said motor for driving said stuffing pump, said motor for rotating said stuffing nozzle, and said motor for driving said pinching device are respectively independently provided.

18. An apparatus for manufacturing chain-like food products such as sausages or the like according to claim 17, wherein a pumping speed of said stuffing pump, a rotating speed of said stuffing nozzle, and a pincher moving speed of said pinching device are respectively independently changeable.

19. An apparatus for manufacturing chain-like food products such as sausages or the like according to claim 5 or 7, further comprising: a motor for driving said stuffing pump; an engaging member through which said stuffing nozzle is inserted and which engages the natural intestine fitted over said stuffing nozzle; a motor for rotating said engaging member; and a motor for driving said pinching device, wherein said motor for driving said stuffing pump, said motor for rotating said engaging member, and said motor for driving said pinching device are respectively independently provided.

20. An apparatus for manufacturing chain-like food products such as sausages or the like according to claim 19, wherein a pumping speed of said stuffing pump, a rotating speed of said engaging member, and a pincher moving speed of said pinching device are respectively independently changeable.

21. An apparatus for manufacturing chain-like food products such as sausages or the like according to claim 5 or 7, wherein said natural intestine fitted over said stuffing nozzle is sectioned into a straightened natural intestine portion and a shirred natural intestine portion, said stuffing nozzle discharging the stuffing material into the straightened intestine portion; wherein said apparatus further comprises a detecting means for detecting a change in a shape of the shirred natural intestine portion; and a stuffing-pump driving mechanism for driving said stuffing pump, said stuffing-pump driving mechanism being adapted to stop the driving of said stuffing pump by means of a signal from said detecting means.

22. An apparatus for manufacturing chain-like food products such as sausages or the like according to claim 5 or 7, wherein said apparatus is adapted that the distal end of the stuffing nozzle is located in a notching portion of the pincher in a state where the pincher moves from the rearward region toward the forward region of the distal end of the stuffing nozzle.

23. A method for manufacturing chain-like food products such as sausages or the like, comprising the steps of:
continuously discharging a stuffing material from a distal end of a stuffing nozzle into a natural intestine to form a stuffed natural intestine forwardly of a distal end of said stuffing nozzle; and
pinching the stuffed natural intestine in a predetermined cycle, continuously conveying the stuffed natural intestine forwardly of the distal end of said stuffing nozzle via a pinched position of the stuffed natural intestine by applying a conveying force directly to an outer peripheral surface of the stuffed natural intestine to reduce a diameter of the natural intestine so as to cause the natural intestine to come into contact with an outer peripheral surface of said stuffing nozzle by pulling and moving the natural intestine on the stuffing nozzle by conveying the stuffed natural intestine based on said conveying force, and rotating the stuffed natural intestine by a rotation of said stuffing nozzle with which the natural intestine with its diameter reduced is brought into contact, so as to form a twist at a pinched position of the stuffed natural intestine, wherein the discharge of the stuffing material into the natural intestine is effected while the natural intestine with its diameter reduced on the stuffing nozzle is pulled out from the distal end of the stuffing nozzle by the stuffed natural intestine conveyed continuously based on said conveying force.

24. A method for manufacturing chain-like food products such as sausages or the like, comprising the steps of:
discharging a stuffing material from a distal end of said stuffing nozzle into a natural intestine to form a stuffed natural intestine forwardly of the distal end of said stuffing nozzle; and
nipping the stuffed natural intestine to apply a conveying force directly to an outer peripheral surface of the stuffed natural intestine and convey the stuffed natural intestine forwardly of the distal end of said stuffing nozzle at a predetermined speed based on said conveying force, reducing a diameter of the natural intestine so as to cause the natural intestine to come into contact with an outer peripheral surface of said stuffing nozzle by putting and moving the natural intestine on the stuffing nozzle by conveying the stuffed natural intestine based on said conveying force, pinching the natural intestine at a predetermined position in a predetermined cycle with respect to the stuffed natural intestine conveyed at a predetermined speed, rotating the stuffed natural intestine by a rotation of said stuffing nozzle with which the natural intestine with its diameter reduced is brought into contact, so as to form a twist at a pinched position of the stuffed natural intestine, wherein the discharge of the stuffing material into the natural intestine is effected while the natural intestine with its diameter reduced on the stuffing nozzle is pulled out from the distal end of the stuffing nozzle by the stuffed natural intestine conveyed at a predetermined speed based on said conveying force.

25. An apparatus for manufacturing chain-like food products such as sausages or the like, comprising:
a stuffing nozzle, over which a natural intestine is fitted, for discharging a stuffing material into the natural intestine;
means for applying a conveying force directly to an outer peripheral surface of a stuffed natural intestine stuffed with the stuffing material and conveying the stuffed natural intestine stuffed with the stuffing material forwardly of a distal end of the stuffing nozzle at a predetermined speed based on said conveying force;
an engaging member, through which the stuffing nozzle is passed, for engaging with an outer surface of the natural intestine fitted over the stuffing nozzle;
means for pinching the stuffed natural intestine at a predetermined cycle;

means for rotating the stuffing nozzle, with which the natural intestine which passes through an engaging hole of the engaging member is brought into contact, so as to form a twist at a pinched position of the stuffed natural intestine by rotating the stuffed natural intestine; and means for supplying the stuffing nozzle with the stuffing material so as to discharge the stuffing material into the natural intestine with its diameter reduced on the stuffing nozzle, the natural intestine with its diameter reduced being pulled out from the distal end of the stuffing nozzle by the stuffed natural intestine conveyed at a predetermined speed based on said conveying force.

26. An apparatus for manufacturing chain-like food products such as sausages or the like, comprising:

a stuffing nozzle, over which a natural intestine is fitted, for continuously discharging a stuffing material into the natural intestine;

a pinching device which includes a pincher comprised of a pair of pincher members for consecutively pinching a stuffed natural intestine stuffed with the stuffing material, and moving means having a wrapping connector means which moves continuously, the pincher members being disposed on said wrapping connector means at predetermined intervals, said wrapping connector means moving the pincher members and applying conveying force to an outer peripheral surface of the stuffed natural intestine through the pincher members so as to reduce a diameter of the natural intestine fitted over said stuffing nozzle as the stuffed natural intestine is conveyed by said pincher based on said conveying force;

a nozzle rotating means for rotating an engaging member engaging with an outer surface of the natural intestine fitted over the stuffing nozzle, and the stuffing nozzle with which the natural intestine with its diameter reduced is brought into contact, said engaging member having an engaging through hole through which the stuffing nozzle and the natural intestine with its diameter reduced are passed; and a stuffing pump device for continuously supplying the stuffing nozzle with the stuffing material, to discharge the stuffing material into the natural intestine with its diameter reduced on the stuffing nozzle, the natural intestine with its diameter reduced being pulled out from a distal end of the stuffing nozzle by the stuffed natural intestine pinched and conveyed by the pincher of the pinching device continuously moving forwardly of the distal end of the stuffing nozzle based on said conveying force.

27. An apparatus for manufacturing chain-like food products such as sausages or the like according to claim 26, wherein said pair of pincher members is disposed such that a center of movement of said pair of pincher members is located laterally of an axis of the stuffing nozzle so that said pair of pincher members moves from a rearward region located rearwardly of the distal end of said stuffing nozzle toward a forward region located forwardly thereof and pinches the stuffed natural intestine.

28. An apparatus for manufacturing chain-like food products such as sausages or the like, comprising:

a stuffing nozzle, over which a natural intestine is fitted, for discharging a stuffing material into the natural intestine;

a conveying device comprised of a wrapping traveling member for pinching and orienting a stuffed natural intestine stuffed with the stuffing material forwardly of a distal end of the stuffing nozzle to apply a conveying force directly to an outer peripheral surface of the stuffed natural intestine and convey the stuffed natural intestine at a predetermined speed so as to reduce a diameter or the natural intestine fitted over said stuffing nozzle as the stuffed natural intestine is conveyed by said conveying device based on said conveying force;

a pinching device disposed between the stuffing nozzle and the conveying device, said pincher device having a pincher comprised of a pair of pincher members for pinching the stuffed natural intestine conveyed by the conveying device at a predetermined cycle and a pair of rotating axles on which the pincher members are disposed and which is disposed at symmetrical position with respect to an axis of the stuffing nozzle;

an engaging member rotatable about the stuffing nozzle for engaging with an outer surface of the natural intestine fitted over the stuffing nozzle, said engaging member having an engaging through hole through which the stuffing nozzle is passed; and a nozzle rotating means for rotating the stuffing nozzle, with which the natural intestine which passes through said engaging through hole of the engaging member is brought into contact, said pair of pincher members being disposed such that a center of movement of said pair of pincher members is located laterally of an axis of the stuffing nozzle so that said pair of pincher members moves from a rearward region located rearwardly of the distal end of said stuffing nozzle toward a forward region located forwardly thereof and pinches the stuffed natural intestine, the engaging member being disposed such that an engaging point of the engaging member and the natural intestine with its diameter reduced on the stuffing nozzle is located more rearwardly than a vertical line with respect to an axis of the stuffing nozzle on the cross-point of a center line of movement of the pincher member parallel to the axis of the stuffing nozzle and a locus circle of movement of the pincer member.

29. An apparatus for manufacturing chain-like food products such as sausages or the like according to claim 28, wherein said apparatus is adapted that a pinching speed of the stuffed natural intestine by the pincher is slower than a conveying speed of the stuffed natural intestine by the conveying device.

30. An apparatus for manufacturing chain-like food products such as sausages or the like according to claim 28, wherein said apparatus is adapted that a pinching speed of the stuffed natural intestine by the pincher is faster than a conveying speed of the stuffed natural intestine by the conveying device.

* * * * *

UNITED STATES PATENT AND TRADEMARK OFFICE
CERTIFICATE OF CORRECTION

PATENT NO. : 5,788,563
DATED : August 4, 1998
INVENTOR(S) : NAKAMURA et al

It is certified that error appears in the above-identified patent and that said Letters Patent is hereby corrected as shown below:

Title page, left-hand column 30, change "Japan ... 7-035702" to --Japan ... 8-035702--.

Title page, left-hand column 56, change "1,366,133" to --1,366,183--.

Column 23, line 47, after "to" insert --stretch said natural intestine and--.

Column 24, line 4, after "to" insert --stretch said natural intestine and--.

Column 24, line 37, after "to" insert --stretch said natural intestine and--.

Column 24, line 53, before "stuffing" insert --a--.

Column 24, line 61, after "to" insert --stretch said natural intestine and--.

Column 25, line 3, delete "in" and insert --at--.

Column 25, line 5, delete "material" and insert --nozzle--.

Column 25, line 6, delete "nozzle" and insert --material--.

Column 25, line 25, after "to" insert --stretch said natural intestine and--.

Column 25, line 62, after "to" insert --stretch said natural intestine and--.

Column 26, line 58, delete "to" (second occurrence) and insert --or--.

Column 28, line 4, after "to" insert --stretch said natural intestine and--.

Column 28, line 32, after "force,", insert --stretching said natural intestine and--.

Column 28, line 35, delete "putting" and insert --pulling--.

UNITED STATES PATENT AND TRADEMARK OFFICE
CERTIFICATE OF CORRECTION

PATENT NO. : 5,788,563
DATED : August 4, 1998
INVENTOR(S) : NAKAMURA et al

It is certified that error appears in the above-identified patent and that said Letters Patent is hereby corrected as shown below:

Column 28, line 58, after "material", insert --to stretch said natural intestine--.

Column 29, line 30, after "to" insert --stretch said natural intestine and--.

Column 30, line 7, delete "pinching" and insert --nipping--.

Column 30, line 12, after "to" insert --stretch said natural intestine and--.

Column 30, line 13, delete "or" and insert --of--.

Signed and Sealed this

Fourteenth Day of September, 1999

*Attest:*

Q. TODD DICKINSON

*Attesting Officer*   Acting Commissioner of Patents and Trademarks

UNITED STATES PATENT AND TRADEMARK OFFICE
CERTIFICATE OF CORRECTION

PATENT NO. : 5,788,563
DATED : August 4, 1998
INVENTOR(S) : NAKAMURA et al

It is certified that error appears in the above-identified patent and that said Letters Patent is hereby corrected as shown below:

Column 1, line 14, delete "casing" and insert --casing,--.

Column 2, line 43, delete "for exclusive use for natural intestine".

Column 2, line 43, after "like", insert --for exclusive use for natural intestine--.

Column 5, lines 21 to 24, delete in their entirety.

Column 8, line 13, after "rotation", insert --of the stuffing nozzle--.

Column 8, line 15, after "the", insert --stretched--.

Column 8, lines 15 to 16, delete "which is stretched by the rotation of the stuffing nozzle".

Column 11, line 7, delete "a stretching force to reduce" and insert --subjecting to reduction in--.

Column 11, line 27, delete "5" and insert --S--.

Column 11, line 58, delete "contact" and insert --contact,--.

Column 12, lines 59 to 60, delete "the straightened natural intestine portion $C_1$" and insert --the shirred natural intestine portion $C_2$--.

Column 12, line 62, after "10 mm,", insert --so that--.

Column 12, line 64, delete "to be" and insert --and is--.

Column 13 line 24, delete ", respectively".

Column 13, line 27, delete ", respectively".

Column 16, line 19, delete "be reduced" and insert --reduction--.

Column 16, line 22, delete "to" and insert --with--.

UNITED STATES PATENT AND TRADEMARK OFFICE
CERTIFICATE OF CORRECTION

PATENT NO. : 5,788,563
DATED : August 4, 1998
INVENTOR(S) : NAKAMURA et al.

It is certified that error appears in the above-identified patent and that said Letters Patent is hereby corrected as shown below:

Column 18, line 19, delete "that" and insert --in which--.

Signed and Sealed this

Twenty-fifth Day of January, 2000

Attest:

Attesting Officer

Acting Commissioner of Patents and Trademarks